(12) United States Patent
Gupta et al.

(10) Patent No.: US 11,693,856 B2
(45) Date of Patent: Jul. 4, 2023

(54) QUERY PROCESSING IN A POLYSTORE

(71) Applicant: Regents of the University of California, Oakland, CA (US)

(72) Inventors: Amarnath Gupta, San Diego, CA (US); Subhasis Dasgupta, San Diego, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 17/478,517

(22) Filed: Sep. 17, 2021

(65) Prior Publication Data

US 2022/0083552 A1 Mar. 17, 2022

Related U.S. Application Data

(60) Provisional application No. 63/079,747, filed on Sep. 17, 2020.

(51) Int. Cl.
*G06F 15/16* (2006.01)
*G06F 16/2453* (2019.01)
*G06F 16/27* (2019.01)

(52) U.S. Cl.
CPC .. *G06F 16/24545* (2019.01); *G06F 16/24535* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 7,680,759 B1* | 3/2010 | Coley | G06F 16/24 707/999.001 |
| 11,281,668 B1* | 3/2022 | Borden | G06F 16/2445 |
| 2005/0283471 A1* | 12/2005 | Ahmed | G06F 16/90335 707/E17.14 |
| 2008/0040317 A1* | 2/2008 | Dettinger | G06F 16/24534 |
| 2009/0276394 A1* | 11/2009 | Bestgen | G06F 16/24542 |

(Continued)

OTHER PUBLICATIONS

Agrawal, D. et al., "Rheem: Enabling multi-platform task execution," In Proc. of the Int. Conf. on Management of Data (SIGMOD), pp. 2069-2072. ACM, 2016.

(Continued)

*Primary Examiner* — Alex Gofman
(74) *Attorney, Agent, or Firm* — Mintz Levin Cohn Ferris Glovsky and Popeo, P.C.

(57) ABSTRACT

A method may include generating, based at least on an analysis plan, a logical plan, the analysis plan specifying one or more operations performed on data stored in a polystore that includes a first database management system and a second database management system. The logical plan may include a sequence of logical operators corresponding to the operators specified by the analysis plan. The generating of the logical plan may include rewriting the sequence of logical operators by at least reordering, replacing, and/or combining one or more logical operators in the sequence of logical operators. Candidate physical plans may be generated based on the logical plan. The analysis plan may be executed based on a physical plan selected from the candidate physical plans. Related systems and articles of manufacture are also provided.

19 Claims, 12 Drawing Sheets

(56) References Cited

U.S. PATENT DOCUMENTS

| | | | | |
|---|---|---|---|---|
| 2011/0072006 | A1* | 3/2011 | Yu | G06F 16/24535 707/718 |
| 2019/0171632 | A1* | 6/2019 | Gupta | G06F 16/24542 |

OTHER PUBLICATIONS

Akhmedov, M. et al., "A fast prize-collecting steiner forest algorithm for functional analyses in biological net-works," In Internaional Conference on AI and OR Techniques in Constraint Programming for Combinatorial Optimization Problems, pp. 263-276. Springer, 2017.
Alsubaiee, S. et al., "AsterixDB: A scalable, open source BDMS," Proceedings of the VLDB Endowment, 7(14):1905-1916, 2014.
Arens, Y. et al., "Query reformulation for dynamic information integration," Journal of Intelligent Information Systems, 6(2-3):99-130, 1996.
Baru, c. et al., "XML-based information mediation with mix," ACM SIGMOD Record, 28(2):597-599, 1999.
Bonaque, R. et al., "Mixed-instance querying: a lightweight integration architecture for data journalism," Proceedings of the VLDB Endowment, 9(13):1513-1516, 2016.
Bruno, N. et al., "Slicing long-running queries," Proceedings of the VLDB Endowment, 3(1-2):530-541, 2010.
Bugiotti, F. et al., "Invisible glue: scalable self-tuning multi-stores," In Conference on Innovative Data Systems Research (CIDR), 2015.
Chan, K.-P. et al., "Efficient time series matching by wavelets," In Proc. of the Int. Conf. on Data Engineering (ICDE), p. 126. IEEE, 1999.
Chirkova, R. et al., "Materialized views," Foundations and Trends in Databases, 4(4):295-405, 2012.
Dasgupta, S. et al., "Analytics-driven data ingestion and derivation in the AWESOME polystore," In Proc. of the IEEE Int. Conf. on Big Data, pp. 2555-2564. IEEE, Dec. 2016.
Dasgupta, S. et al., "Generating polystore ingestion plans—A demonstration with the AWESOME system," In Proc. of the IEEE Int. Conf. on Big Data, pp. 3177-3179, Dec. 2017.
Duggan, J. et al., "The BigDAWG polystore system," ACM SIGMOD Record, 44(2):11-16, 2015.
Garcia-Molina, H. et al., "The TSIMMIS approach to mediation: Data models and languages," Journal of intelligent information systems, 8(2):117-132, 1997.
genesis.ai. /voterfraud. Internet Report at https://www.iwr.ai/voterfraud/index.html, Nov. 2018.
Gog, I., et al., "Musketeer: all for one, one for all in data processing systems," In Proceedings of the Tenth European Conference on Computer Systems, p. 2. ACM, 2015.
Gupta, A. et al., "Toward building a legal knowledge-base of Chinese judicial documents for large-scale analytics," In Legal Knowledge and Information Systems—JURIX 2017: The Thirtieth Annual Conference, Luxembourg, Dec. 13-15, 2017, pp. 135-144, 2017.
Hoang-Vu, T.-A. et al., "Bridging vocabularies to link tweets and news,". In Proc. of the Int. Workshop on the Web and Databases (WebDB), 2014.
Jindal, A. et al., "Selecting subexpressions to materialize at datacenter scale," Proc. of the VLDB Endowment, 11(7):800-812, 2018.
Kang, B. et al., "Through the grapevine: A comparison of news in microblogs and traditional media," In Trends in Social Network Analysis, pp. 135-168. Springer, 2017.
Kas, M. et al., "Incremental algorithm for updating betweenness centrality in dynamically growing networks," In Proc. of the 2013 IEEE/ACM International Conference on Advances in Social Networks Analysis and Mining, pp. 33-40. ACM, 2013.
Kathuria, T. et al., "Efficient and provable multi-query optimization." In Proceedings of the 36th ACM SIGMOD-SIGACT-SIGAI Symposium on Principles of Database Systems, pp. 53-67. arXiv:1512.02568v2, 2017.

Katsifodimos, A. et al., "Materialized view selection for xquery workloads," In Proc. of the ACM SIGMOD Int. Conf. on Management of Data, pp. 565-576. ACM, 2012.
Kolev, B. et al., "The CloudMdsQL multistore system," In Proc. of the Int. Conf. on Management of Data (SIGMOD), pp. 2113-2116. ACM, 2016.
Kraft, T., "Optimization of query sequences," PhD thesis, Institut fur Parallele und Verteilte Systeme (IPVS) der Universitat Stuttgart, 2009.
Lawrence, D., "Twitter study finds coordinated pattern in posts about purported voter fraud," Bloomberg News, Nov. 2018.
Lin, C. "Accelerating Analytic Queries on Compressed Data," PhD thesis, Univ. of California San Diego, Dept. of Computer Sc. and Eng., 2018.
Lin, C. et al., "Plato: Approximate analytics over compressed time series with tight deterministic error guarantees," arXiv preprint arXiv:1808.04876, 2018.
Lin, K. et al., "Answering analytical queries on text data with temporal term histograms," arXiv preprint arXiv:1809.01085, 2018.
Lu, J. et al., "Multi-model databases and tightly integrated polystores: Current practices, comparisons, and open challenges," In Proc. of the 27th ACM Int. Conf. on Info. and Knowl. Management (CIKM), pp. 2301-2302. ACM, 2018.
Mami, I. et al., "A survey of view selection methods," ACM SIGMOD Record, 41(1):20-29, 2012.
Moffitt, V.Z. et al., "Portal: A query language for evolving graphs," arXiv:1602.00773, 2016.
Moffitt, V.Z. et al., "Temporal graph algebra," In Proc. of The 16th International Symposium on Database Programming Languages (DBPL), p. 10. ACM, 2017.
Moffitt, V.Z. et al., "Towards a distributed infrastructure for evolving graph analytics," In Proc. of the 25th Int. Conf. Companion on World Wide Web, pp. 843-848. Int. World Wide Web Conferences Steering Committee, 2016.
Nasir, M.A.U. et al., "Top-k densest subgraphs in sliding-window graph streams," CoRR, 2016.
Onishi, S. et al., "Real-time relevance matching of news and tweets," In OTM Confederated International Conferences"On the Move to Meaningful Internet Systems", pp. 109-126. Springer, 2015.
Pajor, T. et al., "A robust and scalable algorithm for the steiner problem in graphs," Mathematical Programming Computation, 10(1):69-118, 2018.
Pelkonen, T. et al., "Gorilla: A fast, scalable, in-memory time series database," Proceedings of the VLDB Endowment, 8(12):1816-1827, 2015.
Sampat, M.P. et al., "Complex wavelet structural similarity: A new image similarity index," IEEE transactions on image processing, 18(11):2385-2401, 2009.
Sariyuce, A.E. et al., "Incremental algorithms for closeness centrality," In IEEE Int. Conf. on Big Data, pp. 487-492. IEEE, 2013.
Sariyuce, A.E. et al., "Incremental k-core decomposition: algorithms and evaluation," The VLDB Journal, 25(3):425-447, 2016.
Simitsis, A. et al., "Optimizing analytic data flows for multiple execution engines," In Proc. of the ACM SIGMOD Int. Conf. on Management of Data, pp. 829-840. ACM, 2012.
Tan, R. et al., "Enabling query processing across heterogeneous data models: A survey," In IEEE Int. Conf. on Big Data, pp. 3211-3220. IEEE, 2017.
Tian, Y. et al., "Tale: A tool for approximate large graph matching," In Data Engineering, 2008. ICDE 2008. IEEE 24th International Conference on, pp. 963-972. IEEE, 2008.
Tsagkias, M. et al., "Linking online news and social media," In Proc. of the 4th ACM Int. Conf. on Web search and data mining, pp. 565-574. ACM, 2011.
Wang, J. et al., "The myria big data management and analytics system and cloud services," In Proc. of the CIDR Conf., 2017.
Xie, J. et al., "LabelRankT: Incremental community detection in dynamic networks via label propagation," In Proc. of the Workshop on Dynamic Networks Management and Mining, pp. 25-32. ACM, 2013.

(56) References Cited

OTHER PUBLICATIONS

Zhang, Y. et al., "A fast order-based approach for core maintenance," In 33rd Int. Conf. on Data Engineering (ICDE), pp. 337-348. IEEE, 2017.

* cited by examiner (a) before map fusion     (b) after map fusion

QUERY PROCESSING IN A POLYSTORE

RELATED APPLICATION

This application claims priority to U.S. Provisional Application No. 63/079,747 entitled "PROCESSING ANALYTICAL QUERIES IN A POLYSTORE" and filed on Sep. 17, 2020, the disclosure of which is incorporated herein by reference in its entirety.

TECHNICAL FIELD

The subject matter described herein relates generally to database management system processing and more specifically to the processing of analytical queries in a polystore with multiple database management systems.

BACKGROUND

A database management system (DBMS) may be configured to store a plurality of electronic data records. Data stored in the database management system may be organized into one or more database management system objects. For example, a relational database management system may store data in one or more tables. The relationships between different tables may be representative of the relationships that exists amongst the data stored in the relational database management system. By contrast, a non-relational database management system may store data as aggregates of documents, columns, key-value pairs, and/or graphs. To provide access to the data stored in the database management system, the database management system may be configured to support a variety of database management system operations for accessing the data records stored in the database management system. For example, the database management system may support structured query language (SQL) statements and/or an application programing interface (API) that includes a web-enabled application programming interface such as, for example, a representational state transfer (RESTful) based application programming interface, a simple object access protocol (SOAP) based application programming interface, and/or the like.

SUMMARY

Systems, methods, and articles of manufacture, including computer program products, are provided for query processing in a polystore. In one aspect, there is provided a system. The system may include at least one data processor and at least one memory. The at least one memory may store instructions that result in operations when executed by the at least one data processor. The operations may include: generating, based at least on an analysis plan, a logical plan, the analysis plan specifying one or more operations performed on at least a portion of data stored in a polystore that includes a first database management system and a second database management system, the logical plan including a sequence of logical operators corresponding to the one or more operators specified by the analysis plan, the generating of the logical plan includes rewriting the sequence of logical operators by at least reordering, replacing, and/or combining one or more logical operators in the sequence of logical operators; generating, based at least on the logical plan, a plurality of candidate physical plans; and executing, based at least on a physical plan selected from the plurality of candidate physical plans, the analysis plan.

In some variations, one or more features disclosed herein including the following features may optionally be included in any feasible combination. The sequence of logical operators may be rewritten based at least on a first capability of the first database management system and/or a second capability of the second database management system.

In some variations, the sequence of logical operators may be rewritten by at least decomposing a logical operator from the sequence of logical operators into at least a first sub-operation and a second sub-operation, executing the first sub-operation outside of the logical operator, and resuming execution of the logical operator from the second sub-operation.

In some variations, the sequence of logical operators may be rewritten by at least providing, to a logical operator, data corresponding to an optional parameter of the logical operator.

In some variations, the sequence of logical operators may be rewritten by at least replacing, based on a time constraint and/or a computational resource constraint, a first logical operator with a second logical operator providing an approximation of a result of the first logical operator.

In some variations, the sequence of logical operators may be rewritten by at least inserting a first logical operator whose output is used by a second logical operator.

In some variations, the sequence of logical operators may be rewritten by at least executing a logical operator in the first database management system but not in the second database management system.

In some variations, the operations may further include: generating a cross-model index for a first data stored in the first database management system having a first data model and a second data stored in the second database management system having a second data model; and executing the analysis plan further based at least on the cross-model index.

In some variations, the operations may further include: selecting, based at least on a cost model, the physical plan for executing the analysis plan.

In some variations, the cost model may be generated by estimating a cost of one or more subgraphs forming each of the plurality of candidate physical plans.

In some variations, the operations may further include: identifying, based at least on the cost model, a first subgraph having a lower estimated cost than a second subgraph of the physical plan; replacing the second subgraph of the physical plan with the first subgraph having the lower estimated cost; and executing the analysis plan based at least on the physical plan with the first subgraph instead of the second subgraph.

In some variations, the analysis plan may include one or more statements assigning a variable to an expression. At least one statement may combine a first data object conforming to a first data model of the first database management system and a second sub-object conforming to a second data model of the second database management system.

In some variations, the operations may further include: inferring, from the analysis plan, a first constraint associated with the first data model and a second constraint associated with the second data model; and validating, based at least on the first constraint and the second constraint, the analysis plan.

In some variations, the analysis plan may be further validated by performing one or more of a syntax check and a semantic validation.

In some variations, a result of executing the analysis plan may include a composite data object comprising a first sub-object conforming to a first data model of the first database management system and a second sub-object conforming to a second data model of the second database management system.

In another aspect, there is provided a method for query processing in a polystore. The method may include: generating, based at least on an analysis plan, a logical plan, the analysis plan specifying one or more operations performed on at least a portion of data stored in a polystore that includes a first database management system and a second database management system, the logical plan including a sequence of logical operators corresponding to the one or more operators specified by the analysis plan, the generating of the logical plan includes rewriting the sequence of logical operators by at least reordering, replacing, and/or combining one or more logical operators in the sequence of logical operators; generating, based at least on the logical plan, a plurality of candidate physical plans; and executing, based at least on a physical plan selected from the plurality of candidate physical plans, the analysis plan.

In some variations, one or more features disclosed herein including the following features may optionally be included in any feasible combination. The sequence of logical operators may be rewritten based at least on a first capability of the first database management system and/or a second capability of the second database management system.

In some variations, the rewriting of the sequence of logical operators may include one or more of decomposing a logical operator from the sequence of logical operators into at least a first sub-operation and a second sub-operation, executing the first sub-operation outside of the logical operator and resuming execution of the logical operator from the second sub-operation, providing, to the logical operator, data corresponding to an optional parameter of the logical operator, replacing, based on a time constraint and/or a computational resource constraint, a first logical operator with a second logical operator providing an approximation of a result of the first logical operator, inserting a first logical operator whose output is used by a second logical operator, and executing a logical operator in the first database management system but not in the second database management system.

In some variations, the method may further include: selecting, based at least on a cost model, the physical plan for executing the analysis plan, the cost model being generated by estimating a cost of one or more subgraphs forming each of the plurality of candidate physical plans; identifying, based at least on the cost model, a first subgraph having a lower estimated cost than a second subgraph of the physical plan; replacing the second subgraph of the physical plan with the first subgraph having the lower estimated cost; and executing the analysis plan based at least on the physical plan with the first subgraph instead of the second subgraph.

In another aspect, there is provided a computer program product that includes a non-transitory computer readable storage medium. The non-transitory computer-readable storage medium may include program code that causes operations when executed by at least one data processor. The operations may include: generating, based at least on an analysis plan, a logical plan, the analysis plan specifying one or more operations performed on at least a portion of data stored in a polystore that includes a first database management system and a second database management system, the logical plan including a sequence of logical operators corresponding to the one or more operators specified by the analysis plan, the generating of the logical plan includes rewriting the sequence of logical operators by at least reordering, replacing, and/or combining one or more logical operators in the sequence of logical operators; generating, based at least on the logical plan, a plurality of candidate physical plans; and executing, based at least on a physical plan selected from the plurality of candidate physical plans, the analysis plan.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the processing of analytical queries in a polystore, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
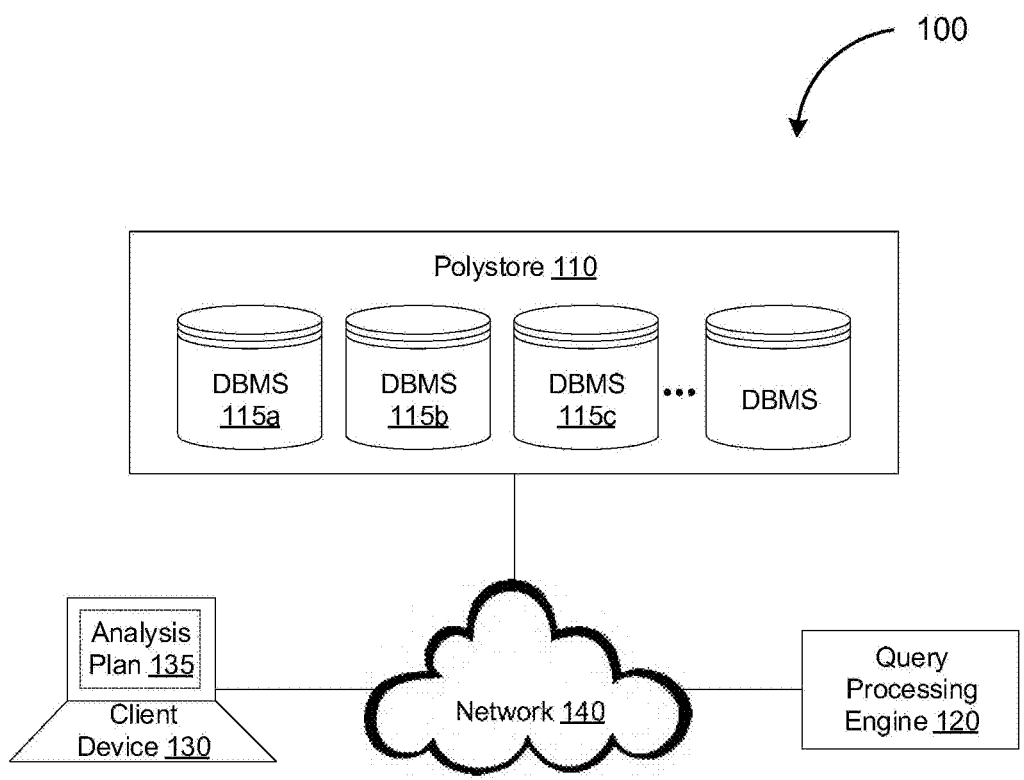
FIG. 1 depicts a system diagram illustrating a polystore system, in accordance with some example embodiments.

A polystore may refer to a data management system storing data in a collection of distinct database management systems. The polystore may be configured to support, for example, the retrieval and analysis of largescale complex, heterogeneous datasets. Each database management system in the polystore may be associated with a different data model including, for example, relational data, text data, graph data, time series data, and/or the like. Moreover, each database management system in the polystore may impose certain constraints in resources, capabilities, and/or the like. For example, some database management systems in the polystore may support data operations (e.g., similarity join over text data) that other database management systems in the polystore do not. Alternatively and/or additionally, some database management systems in the polystore may be able to accept streaming data at a different data rate than other database management systems in the polystore.

In a polystore, a common query processing facility may be constructed over multiple database management systems to enable a user to specify queries across multiple data stores. In contrast with traditional federated data management systems, polystore systems represent multi-model data management systems in which the data management systems underneath the common query processing layer necessarily support different data models. The task of the polystore system is to enable query processing across this model heterogeneity and potentially expose multiple types of query interfaces (e.g., relational and graph query interfaces) to the user. Each component database system underlying a polystore may be optimized for a specific set of operations such as joins for relational stores (e.g., postgreSQL), matrix operations in tensor-based systems, and path-finding in some graph-based stores (e.g., Neo4J). The query processing logic of a polystore system may thus exploit the model-specific characteristics of each component database to efficiently execute cross-model queries.

In order to support a variety of application domains, polystore system may be required to support cross-model queries across data stores as well as analytical operations, which are operations that perform a computation instead of data manipulation and are typically not natively provided by a database management system but by external software libraries. Examples analytical operations may include tasks such as centrality computation on graphs, entity extraction from text, and classification on relational data. An analytical polystore may refer to a polystore that supports analytical operations as first-class functions and is capable of optimizing analytical query workloads containing a mix of queries and analytical operations. Some analytical polystore systems may increase efficiency through techniques such as hardware accelerators while others may integrate multiple analytics engines (e.g., dataframe engines) and data management systems to attain a more comprehensive analytical capabilities for multi-model data. Nevertheless, processing analytical queries with an arbitrary interleaving of retrieval and analytical operations may give rise to various implications in the query planning process. Conventional analytical polystore systems tend to overlook many optimization opportunities and tradeoffs when generating analysis plans for processing analytical queries.

Accordingly, in some example embodiments, a polystore system may include a query processing engine configured to perform query planning based on an analysis plan that corresponds to a user-specified procedure. The query planning may include generating a logical plan, which is a directed acyclic graph (DAG) where each node denotes a logical operator. Moreover, the query planning may include generating, for the logical plan, one or more candidate physical plans in which the logical operators forming the logical plan are replaced with physical sub-plans. To generate the logical plan, the query engine may apply one or more logical rewriting rules to generate an optimal logical plan. Since the query processing engine may generate multiple candidate physical plans for the logical plan, an optimal physical plan may be selected at runtime based on a learned cost model.

FIG. 1 depicts a system diagram illustrating a polystore data management system 100, in accordance with some example embodiments. Referring to FIG. 1, the polystore data management system 100 may include a polystore 110, a query processing engine 120, and a client device 130. As shown in FIG. 1, the polystore 110, the query processing engine 120, and the client device 130 may be coupled via a network 140. The client device 130 may be a processor based device including, for example, a mobile device, a wearable apparatus, a personal computer, a workstation, an Internet-of-Things (IoT) appliance, and/or the like. The network 140 may be any wired and/or wireless network including, for example, a local area network (LAN), a virtual local area network (VLAN), a wide area network (WAN), a public land mobile network (PLMN), the Internet, and/or the like.

Referring again to FIG. 1, the polystore 110 may include multiple database management systems 115 including, for example, a first database management system 115a, a second database management system 115b, a third database management system 115c, and/or the like. The first database management system 115a, the second database management system 115b, and the third database management system 115c may be any type of database management system including, for example, an in-memory database management system, a relational database management system, a non-SQL (NoSQL) database management system, and/or the like. One or more of the database management systems included in the polystore 110 may be distinct database management systems having, for example, a different data model than other database management systems in the polystore. For example, the first database management system 115a may a relational database management system storing relational data, the second database management system 115b may be a graph database management system storing graph data, and the third database management system 115c may be a document-oriented database management system storing text data. However, it should be appreciated that the first database management system 115a, the second database management system 115b, and the third database management system 115c may be associated with any data model. Moreover, at least one of the first database management system 115a, the second database management system 115b, and the third database management system 115c may be a multi-model database management system that supports multiple data models.

Each of the first database management system 115a, the second database management system 115b, and/or the third database management system 115c may each be associated with one or more resource constraints including, for example, limitations in memory, processors, maximum number of threads, timeout parameters, and/or the like. Alternatively and/or additionally, the first database management system 115a, the second database management system 115b, and/or the third database management system 115c may support and/or be optimized for different analytical operations such as, for example, select, match, merge, view, and/or the like. For example, the first database management system 115a, the second database management system 115b, and the third database management system 115c may each support some but not all analytical operations. Furthermore, the first database management system 115a, the second database management system 115b, and/or the third database management system 115c may be capable of performing some analytical operations faster and/or more efficiently than other analytical operations.

In some example embodiments, the query processing engine 120 may be configured to process an analysis plan 135 received from the client device 130. The analysis plan 135 may correspond to a procedure specified by a user at the client device 130. For example, the analysis plan 135 may describe one or more operations for retrieving, transferring, and/or manipulating data stored in the polystore 110. The query processing engine 120 may process the analysis plan 135 by generating a corresponding logical plan, which may be a directed acyclic graph (DAG) where each node denotes a logical operator. Moreover, the query processing engine 120 may process the analysis plan 135 by generating, for the logical plan, one or more candidate physical plans in which the logical operators forming the logical plan are replaced with physical sub-plans. To generate the logical plan, the query processing engine 120 may apply one or more logical rewriting rules to generate an optimal logical plan. Since the query processing engine 120 may generate multiple candidate physical plans for the logical plan, an optimal physical plan for executing the analysis plan 135 may be selected at runtime based on a learned cost model.

In some example embodiments, the analysis plan 135 received from the client device 130 may be in a dataflow language as a sequence of assignment statements in which the left hand side (LHS) of the assignment is a variable and the right hand side (RHS) of the assignment is an expression. The right hand side expression of an assignment statement may use any previously specified left hand side variable as a parameter. The analysis plan 135 in the dataflow language may correspond to a directed acyclic graph (DAG) whose nodes represent operations and whose edges represent the flow of data, including initial data and intermediate data, from one operator to another. The one-expression-per-statement syntax of the dataflow language with simple variable passing may afford an opportunity for optimizing the analysis plan 135 as a whole. The dataflow language may also natively recognize a rich set of data types as well as various manipulation and analytical operations. The dataflow language may be configured to support "pass through" queries that direct query a specific underlying database management system using its native query language. Nevertheless, the dataflow language may be independent of the underlying database management systems. Instead, the dataflow language may be bound to standard languages such as SQL-93 for relational queries, OpenCypher for property graph queries, Lucene for retrieval from text indices, and a number of analytical functions that can be implemented by multiple software libraries. As such, an operation supported by the dataflow operation may be mapped to multiple data and function sources. Moreover, the dataflow language may allow a mix of querying, data transformation, and object creation within the same analysis plan 135, thus creating a cross-model view of the data (e.g., creating a graph view of data originally stored in a relational database) that supports all operations allowed by the data model of the view. Any intermediate results, including new views, may be selected for materialization. Although the database management system used for storage is determined by the polystore 110 by default, this setting may be overridden.

Table 1 below depicts the native datatypes that the dataflow language of the polystore system 100.

| Datatype | Description |
| --- | --- |
| Primitive Types | Integer, Double, String, and Boolean. |
| Collection Types | List is a collection of indexed elements with homogeneous type; a Tuple is a finite ordered sequence of elements with any type; a Map is a collection of key-value pairs where keys and values are of a homogeneous type. List data type is strictly homogeneous: each element should have the same type and also metadata. For example, suppose is a list of relations, then all the relations should have the same schema. However, there can be heterogeneous objects in a Tuple data type. For example, the following tuple has a relation, graph, list and constant values inside. R := executeSQL(. . . , . . .); //produces relation R G := executeCypher(. . . , . . .); //produces graph G T := {R, G, 1, 2, 3, "string", 2}; |
| Relation and Record | The Relation data type to represent relational tables and a Record data type is a single tuple of a relation. |
| Property Graph and Graph Element | The PropertyGraph model supports the construction, querying, and application of analytical functions (e.g., Pagerank). A GraphElement data type can be either a node or edge with labels and properties. |
| Corpus and Document | A Corpus is a collection of documents, and each document consists of document content (String), a document identifier (Integer) and tokens (List<String>) created through a customizable tokenization operation. |
| Matrix | A matrix may have two optional properties: row map and column map which are semantic mappings from matrix row (resp. column) indices to values in any other supported data type. For example, for a document term matrix, the row map is a mapping from row indices to the document ids and the column map is a mapping from column indices to terms (i.e., tokens). |

A script in the dataflow language of the polystore system 100 may start by declaring a polystore instance that is declared in the application catalog, followed by the main code block containing a sequence of assignment, store (materialization), and return (output) statement. An example of the script is depicted below. The application catalog record newsDB may contains the connection details of the underlying database management systems 115 that serve as data sources and as intermediate data caches used during the execution of the analysis plan named newstopicanalysis.

```
USE newsDB;
create analysis newstopicanalysis as (
/* main code block */
)
```

An assignment may evaluate a right hand side expression and assigns the result to one or more left hand side variables. An example assignment is shown below.

```
(assignment-statement) ::= (var1) ', ' (var2) ', ' • • • ':=' (assign)
(assign) ::= (basic-expr) | (ho-expr)
```

As shown below, the right hand side expression of an assignment may be "basic" or "higher-order."

```
(basic-expr) ::= (const)|(query)|(func)
(ho-expr) ::= (assign) '>' | '==' | '<' (assign)
  | (var)'.map(' (lVar) '->' (assign) ')'
  | (var)'.reduce((' (lVar1) ',' (lVar2) ')->' (assign) ')'
  | (var) ' where ' (assign)
```

The dataflow language may include three types of basic assignment expressions: constant, queries, and function. In a constant assignment expression, the right hand side expression may evaluate to a constant of any allowed data type. The right hand side expression may itself be a constant (e.g., a:=['x', 'y', 'z']), an element of prior collection variable (e.g., b:=a[1]), or the result of a legal operation specified in the right hand side expression (e.g., c:=length(a)).

A query-based assignment may execute a query against a data store in its native language or against a view constructed in a prior operation. An example of a query-based assignment is shown below.

```
src := "New York Times";
rawNews := executeSQL("NewsDB",
"select id as newsid, news as newsText
from usnewspaper
where src = $src limit 1000");
```

The foregoing example shows an analytical plan in which the first statement assigns a constant string the left hand side variable src and the second statement executes an SQL query on a resource called "News" (first argument of executeSQL). The schema of the tables and connection string associated with "News" may be available from the catalogs maintained by the polystore 110. The second argument of executeSQL is a standard SQL query with the exception the $src variable. The dataflow language may uses $ as a prefix of a left hand side variable from a prior step that is passed as a parameter to the SQL query. If an SQL query is issued against the results of prior step (e.g., the SQL query uses left hand side variables already in the script), then the "resource" argument of executeSQL may be left empty. The operations executeCypher and executeSolr are used in a similar fashion. It should be appreciated that the passing of the $-prefixed variables is a means to perform cross-model operations in the dataflow language of the polystore 110.

The result of a function call may also be assigned to left hand side variables. The polystore 110 may support a rich native library for common data analytical tasks. The syntax includes function name with required positional parameters followed by optional parameters and named parameters. A parameter may be a constant value or a variable of the polystore 110. A function can return multiple results as output. An example of a function-based assignment is shown below.

```
processedNews := tokenize(rawNews.newsText,
    docid=rawNews.newsid,
    stopwords="stopwords.txt");
DTM, WTM := lda(processedNews,
    docid=true, topic=numTop);
```

The tokenize function in the example takes a text column from a relational table as parameters and takes another two named parameters docid and stopwords, and generate a corpus variable. An important feature of function-based assignment is that a function may produce multiple outputs, and in these cases, the left hand side has a list of variables. The lda function, for instance, takes a corpus variable processedNews as input and returns two text matrix variables DTM (document-topic-matrix) and WTM (word-topic-matrix). The Boolean docid parameter confirm that the documents have IDs and topic parameter is a constant, specifying the number of topics that the LDA model would use.

Figure 2:
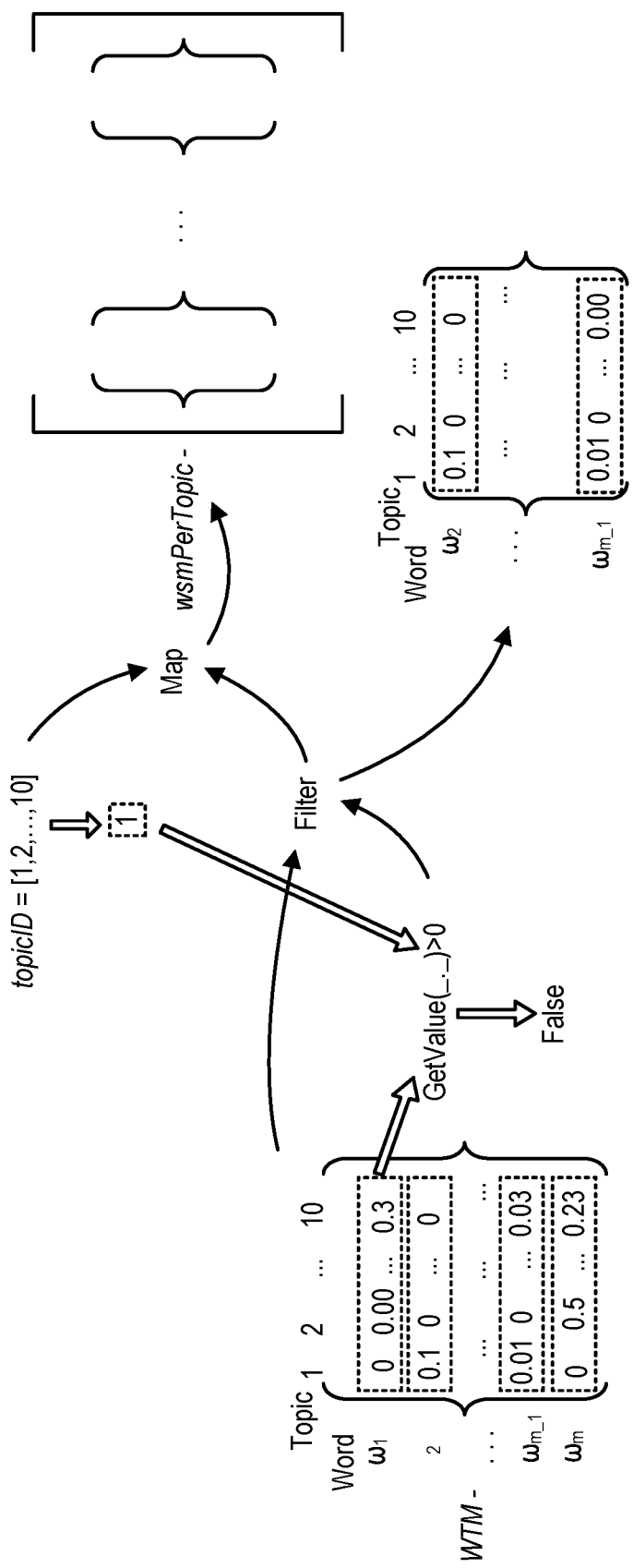
FIG. 2 depicts an example of a higher order expression, in accordance with some example embodiments.

An example of a higher order expression is shown below. A schematic diagram illustrating the higher order expression is shown in FIG. 2. As shown, a higher order expression may be defined recursively where an assignment expression can serve as a sub-expression. The dataflow language snippet shows a nested high order assignment expression where a high order assignment expression serves as a sub-expression for another. For example, the right hand side expression filters a word-topic matrix WTM and for every topic, produces a matrix which consists of words with weights higher than 0 on this topic. As shown in FIG. 2, topicID is a list of Integers and WTM is word-topic matrix where each row presents a word's importance over all topics. In FIG. 2, for topic 1, the filter expression iterate each row and only keep rows where the first element is larger than 0.

```
wtmPerTopic := topicID.map(i =>
WTM where getValue(_:Row, i) > 0.00);
```

Referring again to the foregoing example, the dataflow language snippet includes three constructs—map, filter, and binary comparison. Map expressions in the dataflow language of the polystore 110 may correspond to similar constructs in functional languages. A map expression may operate on a collection variable, evaluates an expression (a sub-expression) for every element of the collection, and returns a collection object. The sub-expression can be a constant, a query, a function or another higher-order operation. The map expression in the example takes a list of integers (topicID) as input, and for each, applies another high order expression (a filter expression) on the WTM matrix to generate a matrix. Thus the returned variable (wtmPerTopic) is a list of matrices.

The filter expression may be indicated by the where clause—its sub-expression is a predicate—and return a new collection with values which satisfy the given predicate. The example in the snippet shows iterative matrix filtering using a row-based iteration mode. Since a matrix can be iterated by rows or by columns, users need to specify the iteration mode: the underscore sign (_) is used to represent every single element in the matrix, and the colon (:) followed by the type specify the element type. In this example, it applies a binary comparison predicate on each row of the matrix and returns a new matrix containing the rows satisfying the predicate.

A binary comparison may accept two expressions and compare their values to return a Boolean value. For example, in the example above, the binary comparison checks to see if the i-th column (of a row) is positive. More generally, the dataflow language of the polystore 110 supports binary logical operators such as AND, OR and NOT over predicates.

The reduce operation may be similar to that found in functional languages. The sub-expressions of reduce may be commutative and associative binary operators. An example of reduce operation is shown in the snippet of dataflow language below. Reduce may return a single value as the accumulated value. The example takes a list of relations as input, then joins every two tables and returns a new table.

```
R := relations.reduce((r1,r2) => join(r1,r2,on="id"))
```

A store statement may specify the variables to be stored to a persistent storage, which can be an underlying database management system specified in the system catalog or a file system associated with the polystore 110. The store statement may also include instructions for how to store the variable. For example, in the following example, the store statement stores a list of lists (aggregatePT) as a relation to a relational database management system, specifies the database management system alias in the system catalog (dbName), specifies table name and column names, and it will store the element location index in the list as a column by specifying the optional keyword argument index as True.

```
store(aggregatePT, dbName="News",
   tableName="aggregatePageRankofTopk",
   index=True, columnName=["id", "pagerank"]).
```

A more complex case may arise when storing the result of a nested higher-order expression like wtmPerTopic which, as shown in FIG. 2, produces a list of matrices. In the following store statement, the rowID, columnID, and the cell value as columns of the table, and use the list index (which is the topicID) may be used as a "pointer" column to the appropriate matrix.

```
store(wtmPerTopic w, dbName="News",
   tableName="TopicWTM",
   index=True, columnName=["TopicID"=w.index, "Word"=w.rowID,
   "topic"=w.columnID, "membership"=w.value]).
```

The dataflow language of the polystore 110 may exhibit a number of properties useful in validating and developing logical plans from scripts in the dataflow language. For example, the dataflow language does not have a for loop or a while operation. Instead, it uses the map operation to iterate over a collection to compute an inner function and the reduce operation to compute an aggregate function on members of a collection. The collection must be completely constructed before the map (resp. reduce) operation can be performed. Therefore, these operations are guaranteed to terminate. The dataflow language of the polystore 110 is strongly typed in that the language enforces strict restrictions on intermixing values of different datatypes. In an assignment where the right hand side expression is a query in a schemaless language like OpenCypher, the user may be required to specify a schema for the left hand side variable in the current system. However, in other cases, the type of any left hand side variable can be uniquely and correctly determined by analyzing the right hand side expression.

Figure 3:
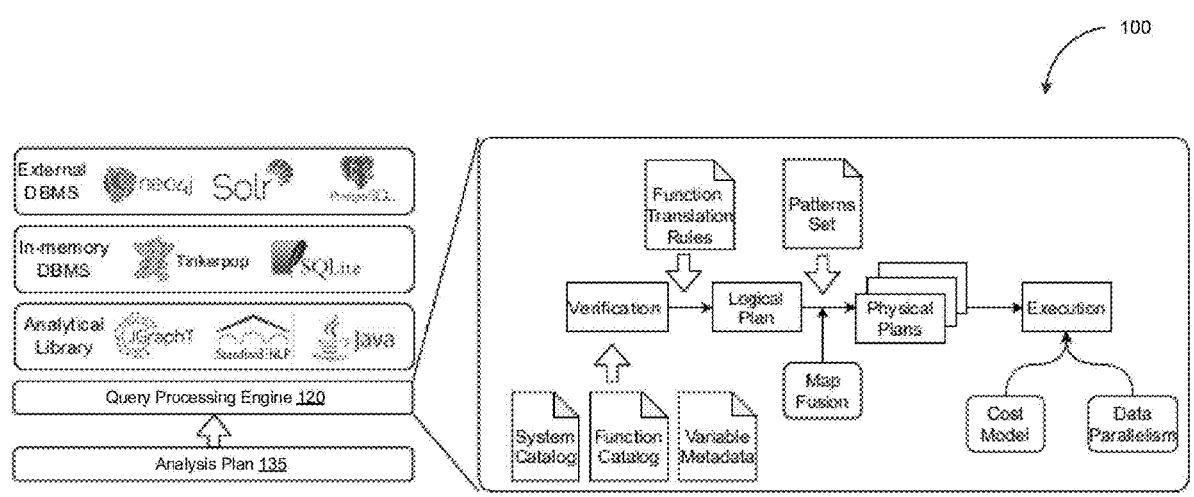
FIG. 3 depicts a schematic diagram illustrating the architecture of the polystore system, in accordance with some example embodiments.

FIG. 3 depicts a schematic diagram illustrating the architecture of the polystore system 100, in accordance with some example embodiments. As shown in FIG. 3, the polystore system 100 may include the one or more database management systems 115 (e.g., one or more external database management systems and in-memory database management systems), a disk-based file system, system catalogs, function catalogs, a library of registered analytical libraries, and the query processing engine 120. As shown in FIG. 3, the query processing engine 120 may include a query validator, a logical planner, a physical planner, and an execution engine. In some example embodiments, the query processing engine 120 may include, for every supported data model, at least one corresponding data store housed in a single or multiple machines and one or more in-memory data manipulation engine.

Referring again to FIG. 3, the system catalog may include a set of in-memory tables that maintain several different types of information including, for example, the connection information of each external data store. If an underlying data store admits a schema (e.g., PostgreSQL, Solr), a copy of the schema may be maintained in the catalog. For stores that do not admit a schema (e.g., neo4J), a set of schema-like information (e.g., node/edge types and their count) may be maintained. The system catalog may also include the metadata for user-defined analysis plans, such as the analysis plan 135, including the specific data sources used by the analysis plan.

The function catalog may be a registry for analytical libraries and the functions they contain. In addition, the function catalog may also documents analytical functions supported by the data stores. For example, Solr supports a term-vector output containing TF-IDF values of every term in a search result. Similarly, the Neo4J algorithm library supports PageRank function. The input and output signatures may be maintained for each function as binding patterns with optional parameters, along with a pointer to its executable code. In some example embodiments, the return data type of every function would conform to a known data type supported by the polystore 110. However, since this may not be true for an external library, the catalog may host a library of transformer functions and ensures that all functions are guaranteed to produce data that the rest of the system can consume.

Since a "query" in the polystore 110 is essentially a multi-statement analysis plan that includes data retrieval, transformation, storage, function execution, and management of intermediate results, the query processing engine 120 may be designed as a mix between a multi-query optimization engine and a workflow optimization engine. To manage this process, the query optimization engine 120 may maintain an intermediate variable management scheme using multiple in-memory engines like SQL-lite and Tinkerpop, as well as a benchmark-suite for every function in the function catalog to be used for optimization.

Referring again to FIG. 3, the analysis plan 135 may be complex with many expensive operations executed by internal and external engines and libraries. To reduce the risk of avoidable run-time errors, the query processing engine 120 may implement a strict compile-time semantics check mechanism to detect as many errors as possible before the query planning and executing stages. Validation of the analysis plan 135 may include syntax checks, semantic validation using catalogs and variable's metadata, and type inference to get variables' metadata. For example, for each statement within the analysis plan 135, a syntax check may be performed by using a jtree parser which defines the language grammars.

Semantic validation of the analysis plan 135 may be performed based on a system catalog that includes the meta information of all underlying external databases, a function catalog which records the input and output types of functions registered with the polystore 110, and a variable metadata map which stores the key properties of each in-system variables. The information stored in the variable metadata may vary for different data types. The query expressions (<query>) may be validated based on the system catalog if the queries are against the external database management systems. For a SQL query, the schema of all relations in the relational database management system used in the query can be found from the system catalog. Thus, validation may include verifying whether the relations or columns in the query exists. For a Cypher query, the validation may include checking if the nodes' or edges' properties and labels in the query exist in the database. For the function expressions (<func>), the query processing engine 120 may verify if the data types of the input variables and constant values are consistent with the information registered in the function catalog.

Variable metadata map may be looked up for every type of statements if there are variables in them. For a query expression, if it queries on relations within the polystore 110, then their schema will be found from the variable metadata map instead of the system catalog. For a function expression, if an input is a variable, the data type of the variable will be found from the map. For a high order expression, such as shown in FIG. 2, the Map expression may be validated by getting the data type and element type of topicID from the metadata map, and the data type needs to be one of the collection data types and the element type will be used to validate the sub-expression which is a Filter expression. To validate the Filter expression, similar to the Map expression, the data type of WTM may be checked and the element type is used to validate the sub-expression which is a function, besides, the return type of the sub-expression needs to be Boolean which means the sub-expression needs to be a function that returns a Boolean value or a binary comparison expression. To validate the Binary Comparison expression, it validates if the two operands have the same data type and are comparable, and in this example, the type of the left operand can be inferred based on the function catalog.

Table 2 below shows the possible types of left hand side variables in the dataflow language of the polystore 110, and their corresponding metadata properties inferred by the validator module. For each statement in the analysis plan 135, for example, after validating the correctness, the type and metadata information of the left hand side variable will be inferred as much as possible and stored to the variable metadata map. Thus, if the analysis plan 135 contains cross-model view construction rules from a first data model to a second data model, the query processing engine 120 may infer constraints between data objects corresponding to the first data model and the data objects corresponding to the second data model. Doing so may allow a user to construct, for example, a property graph from a set of relations or a JSON document from a graph and a relational table. Moreover, the result of executing the analysis plan 135 may be a composite object holding a multiplicity of sub-objects, each potentially belonging to a different data model (e.g., a tuple with a first attribute that is a string, a second attribute that is a graph, and a third attribute that is a list of relations).

TABLE 2

| Data Type | Metadata |
|---|---|
| Relation | Schema S = {ColName: Type} |
| Property Graph | Node labels set NL |
|  | Node properties map NP = {PropName: Type} |
|  | Edge labels EL |
|  | Edge properties map EP = {PropName: Type} |
| List | Element type, Element metadata, Size |
| Tuple | Types and metadata of each element in a tuple, Size |
| Map | Key type, Key metadata, Value type, Value metadata, Size |
| Matrix | Row (and column) count, Row (and column) map value type |

Based on different expressions, there are different types of inferencing mechanisms. For query expressions that are SQL queries, for example, the schema of the returned relation will be inferred by parsing the SELECT clause and looking up the system catalog to get column types. For a Cypher query or a Solr query, the schema will be provided explicitly by users. For function expressions, the returned types are registered in the function catalog, for example, the following expression calls function lda, and based on the function catalog, it outputs two matrix variables, thus the data types of DTM, WTM will be set as Matrix.

DTM, WTM := lda(processedNews, docid=true, topic=numTopic);

For nested expressions, the inference will be handled from the innermost expression to the outermost expression. Take the example snippet from FIG. 2 for illustration, it infers the left hand side variable's meta-data by analyzing the expression from the inside to outside: 1) the Filter expression returns a matrix because WTM is a matrix, 2) then Map expression will return a list of matrices since its sub-expression returns a matrix.

Upon successfully validating the analysis plan 135, the query processing engine 120 may continue to process the analysis plan 135, which may include generating a logical plan and one or more candidate physical plans. For example, based on the parsing result of the analysis plan 135, the query processing engine 120 may create a logical plan that is a directed acyclic graph (DAG) in which each node corresponds to a logical operator. The query processing engine 120 may then apply one or more applicable logical rewriting rules in order to create an optimized logical plan.

Figure 4:
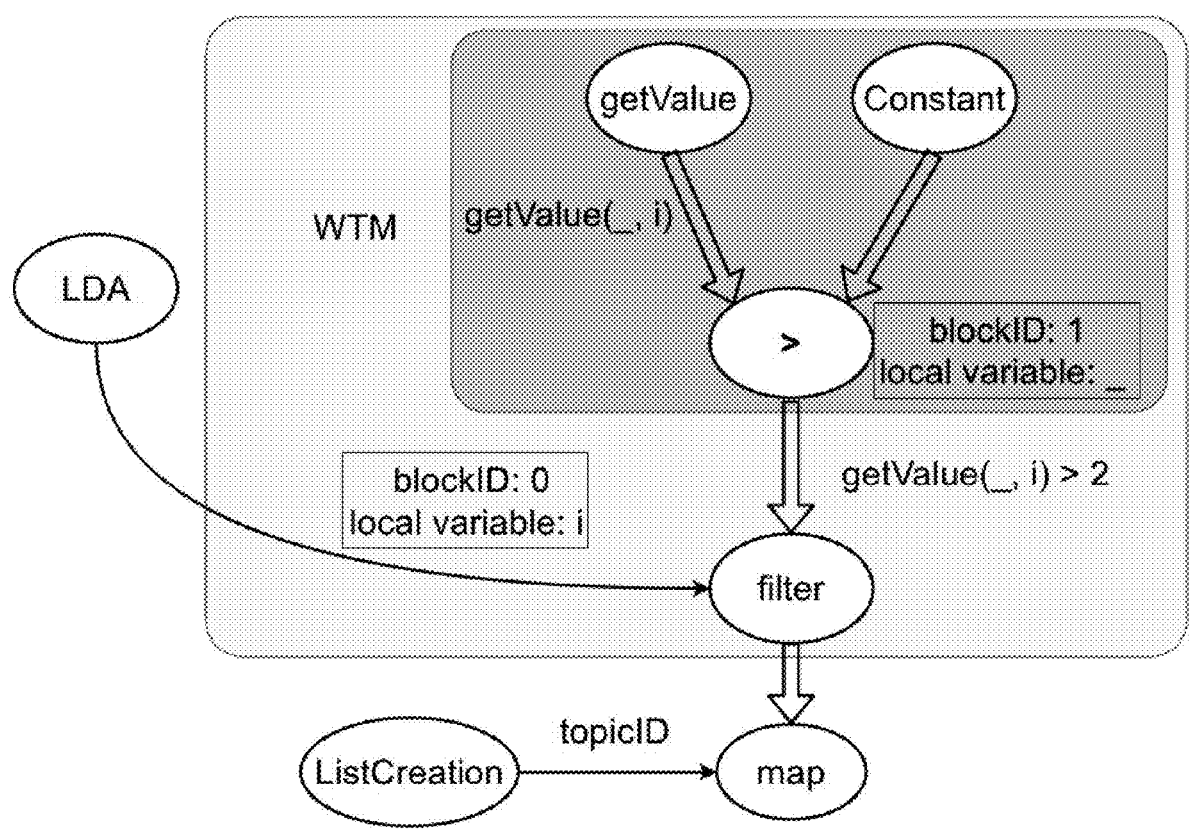
FIG. 4 depicts a schematic diagram illustrating an example of a logical plan, in accordance with some example embodiments.

Usually, a single statement in the analysis plan 135 may be directly mapped to a logical operator when generating the logical plan. For example, an ExecuteSQL statement will be translated to an ExecuteSQL logical operator. However, for statement involving high order operations (e.g., map) or some specific functions, a single statement may be translated to more than one logical operators. For instance, for high order expressions, the query processing engine 120 may generate the high order operator and sub-operators. Returning to the example of the higher order expression shown in FIG. 2, a corresponding logical plan is depicted in FIG. 4. There are two types of edges in a logical plan: the edges connecting two operators except the high order operators are data flow edges which indicate that the variable is generated by the upstream operator and consumes by the downstream operator, and the edges connecting a sub-operator to a high order operator are operator flow edges. In FIG. 4, the Filter operator takes data from LDA operator and apply the binary comparison sub-operator on the data; the Map operator takes data from ListCreation operator and apply the Filter sub-operator on each element of the data.

Besides the high order statements, for some function statements, a function may be decomposed to several logical operators. Table 3 below shows some functions and their corresponding logical operators. Based on different input parameters, a function can be translated to different operators. For functions such as LDA, the input can be a Text-Matrix variable or a Corpus variable and they will be translated to different operators. Many functions will be decomposed to several logical operators: For NER function which recognize named entities in corpus, when the input is corpus, it will be translated to a series of CoreNLPAnnotator operators; when the input is a List of strings, it will add a CreateCorpusFromList operator before these CoreNLPAnnotator operators.

TABLE 3

| ADIL Function | Input Parameter | Logical Operator |
| --- | --- | --- |
| Preprocess | Column | CreateCorpusFromColumn |
| | List<String> | CreateCorpusFromList |
| | Corpus | NLPAnnotator(tokenize) |
| | | NLPAnnotator(ssplit) |
| | | NLPAnnotator(pos) |
| | | NLPAnnotator(lemma) |
| | | FilterStopWords |
| NER | Column | CreateCorpusFromColumn |
| | List<String> | CreateCorpusFromList |
| | Corpus | NLPAnnotator(tokenize) |
| | AnnotatedCorpus | NLPAnnotator(ssplit) |
| | | NLPAnnotator(pos) |
| | | NLPAnnotator(lemma) |
| | | NLPAnnotator(ner) |
| TopicModel | TextMatrix | TopicModelOnTextMatrix |
| | Corpus | TopicModelOnCorpus |
| LDA | TextMatrix | LDAOnTextMatrix |
| | Corpus | LDAOnCorpus |
| SVD | TextMatrix | CreateTextMatrix |
| | Corpus | SVDOnTextMatrix |
| Sum | List | Column2List |
| | Column | GetVector |
| | Vector | SumList |
| | Matrix, Index | SumVector |

In some example embodiments, the query processing engine 120 may apply one or more logical rewriting rules in order to generate the optimal logical plan for the analysis plan 135. Examples of logical rewriting rules include redundancy elimination and pipeline execution. For redundancy elimination, the query processing engine 120 may rewrite the logical plan such that the same operators are executed no more than once. As Table 3 shows, some functions may share common logical operators, thus allowing the same operators to be merged and executed a single time. Moreover, the rewriting of the logical plan may be performed logical plan based on the query capabilities of the underlying database management systems (e.g., the one or more database management systems 115). Accordingly, the logical plan may be rewritten in a way that is consistent with the query capabilities of the underlying database management systems. For example, some database management systems are able to accept data in streaming mode (e.g., Apache Solr) while some database management systems do not allow the result of a query to be requested in batches (e.g., Neo4J) and others are more expensive for certain operations (e.g., JSON queries in PostgreSQL).

The pipeline execution of operators may minimize the materialization of intermediate results. Each logical operator may be associated with a pipeline capability and parallelism capability. For example, some queries operators such as ExecuteCypher have a stream output (SO) capability since they need to take a materialized input (e.g., a graph) and the results can be returned as a stream to the next operator. Many analytical function operators, such as LDA, can be executed in parallel by partitioning the input data (e.g., the corpus). A capability is set based on the operator's ability, while a mode is the true execution mode of the operator and it is related to the predecessor's and successor's capabilities.

As used herein, a logical operator may have a Parallelable (PR) capability if the input can be partitioned in order to utilize multi-cores. Otherwise, the logical operator may have a sequential (SE) capability. The parallelism mode is the same as the capability since every operator will be executed in parallel using all cores if it is parallel-able.

There are four types of pipeline capabilities based on if the input or output of an operator can be a stream: Blocking (B), Stream Input (SI), Stream Output (SO) and Pipeline (P). Logical operators with the stream input capability or pipeline capability can take stream as input while logical operators with stream output capability or pipeline capability can generate stream output. The pipeline modes of operators have the same four types and are set based on Algorithm 1 below considering operators' predecessors and successors.

In order to maximize parallelism, the query processing engine 120 may require that operators in a pipeline to include operators with the same parallelism capability. A pipeline is a chain of operators where the upstream operator passes a stream to a downstream operator and the first operator in the pipeline gets a materialized input. As used herein, a parallel pipeline is a pipeline where all operators have parallelism mode; while a sequential pipeline means all operators in the pipeline have sequential mode.

Algorithm 1 below shows how to determine the pipeline mode of operators in a logical directed acyclic graph. The directed acyclic graph will be partitioned to chains since an operator with several successors will always generate materialized output and an operator with several predecessors will always take materialized input. To exploit parallelism, a sequential operator will not join a parallel pipeline and a parallel operator will not join a sequential pipeline. Line 9 guarantees this. An operator's input mode is set based on its predecessor's execution mode (lines 5-7) and its output mode is set based on its own capability and its predecessor's capability (lines 9-11).

Algorithm 1: Pipeline Algorithm

Input: A logical plan DAG G = (V, E), where each operator v ∈ V has pipeline and parallelism capabilities v.pipeC and v.paraC
Output: G, where each executor v ∈ V has pipeline execution modes v.exeM.
/* partitioning graph to chains */
1  Chains ← CutGraph (G);
2  for subG ∈ Chains do
3    for op ∈ subG do
4      streamIn ← false, streamOut ← false;
       /* set input mode on predecessor's execution mode */
5      p ← FindPredecessor (op, subG);
6      if p.exeM == P∥p.exeM == SO then
7        streamIn ← true
       /* set output mode on successor's capabilities */
8      c ← FindSuccessor (op, subG);
9      if c! = null && c.paraC == op.paraC then
10       if (op.pipeC == SO ∥op.pipeC == P)&&(c.pipeC == P∥c.pipeC == SI) then

| Algorithm 1: Pipeline Algorithm |
| --- |
| 11    streamOut ← true
    /* set operator's execution mode */
12    if streamIn&&streamOut then op.exeM = P;
13    if streamIn&&!streamOut then op.exeM = SI;
14    if !streamIn&&streamOut then op.exeM = SO;
15    if !streamIn&&!streamOut then op.exeM = B; |

As one example of a pipeline, many natural language processing (NLP) toolkits, such as Stanford coreNLP, execute a pipeline of annotators so that the intermediate results will not be stored. In the polystore 110, when there is a chain of NLPAnnotator operators, since they all have pipeline capability, they will form a pipeline, and to simplify the corresponding directed acyclic graph, these operators are merged as a single NLPAnnotatorPipe operator which all the annotations, which is shown in FIG. 2.

Figure 5:
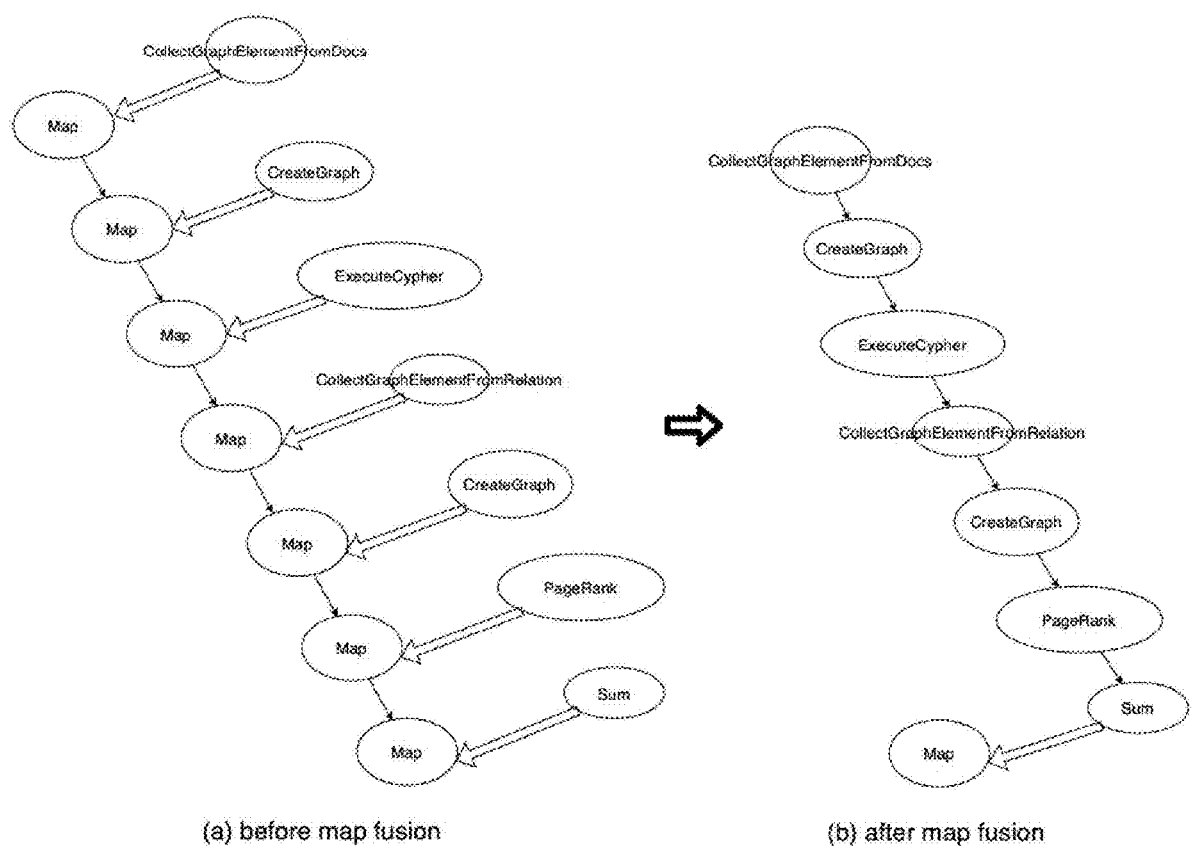
FIG. 5 depicts an example of a pipeline created through map fusion, in accordance with some example embodiments.

Another example of a pipeline includes a chain of Maps operators. FIG. 5 shows an example that corresponds to a snippet of example workload 1, the left plot is the naive logical plan without applying pipeline algorithm, and the right one applies map fusion. Since Map has a pipeline capability, these Map operators will form a pipeline, and the query processing engine 120 fuses them to one Map operator, and the sub-operators of these Map operators will be connected. This map fusion optimization may save time by avoiding the storage of intermediate results and help the creation of candidate physical plans, which will be explained in more detail below.

Figure 6:
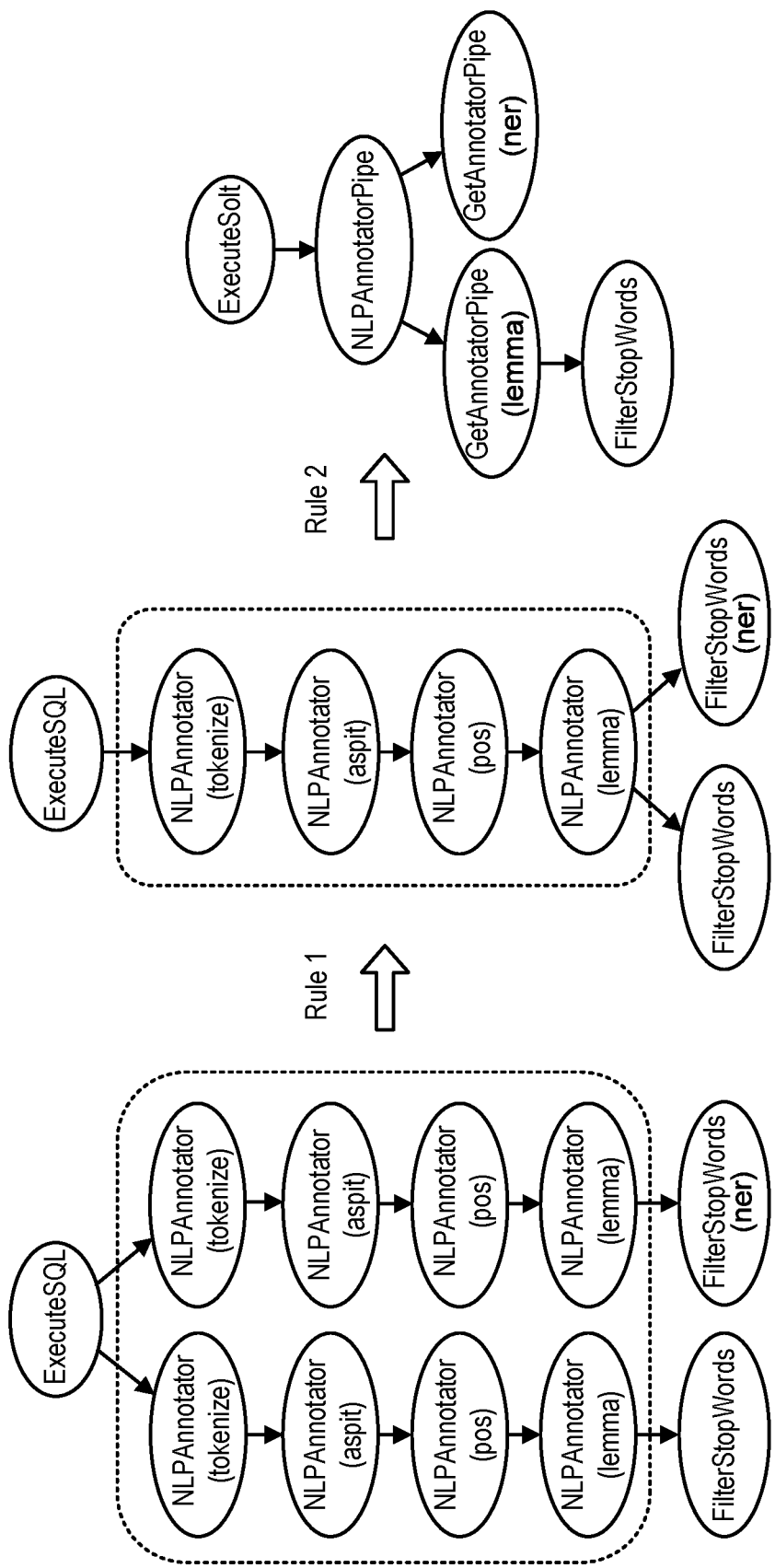
FIG. 6 depicts a schematic diagram illustrating an example of rewriting a logical plan, in accordance with some example embodiments.

To further illustrate the foregoing logical rewriting rules, consider the snippet below, which may be part of the analysis plan 135. The first two rewriting rules are shown in FIG. 6. The first subgraph in FIG. 6 shows the raw logical plan. The functions Preprocess and NER share a series of common logical operators, which will be merged based on the first logical rewriting rule.

```
doc<news:String> := executeSOLR("news", "q=rows=5000");
processedDoc := Preprocess(doc);
namedEntity := NER(doc);
```

Given a logical plan, the query processing engine 120 may generate a set of candidate physical plans based on a pattern set. As used herein, a pattern set and candidate physical plans may be defined as follows. A pattern set Pat: {{OP', E} →{OP', E'} is a map where a key is a logical sub-DAG and a value is a set of physical sub-DAGs. Candidate physical plans include a DAG PG={OP$^p$, E} which contains some virtual nodes and a map PM: I→{OP$^p$, E} where a key is the id of a virtual node and a value is a set of physical sub-DAG.

Figure 7:
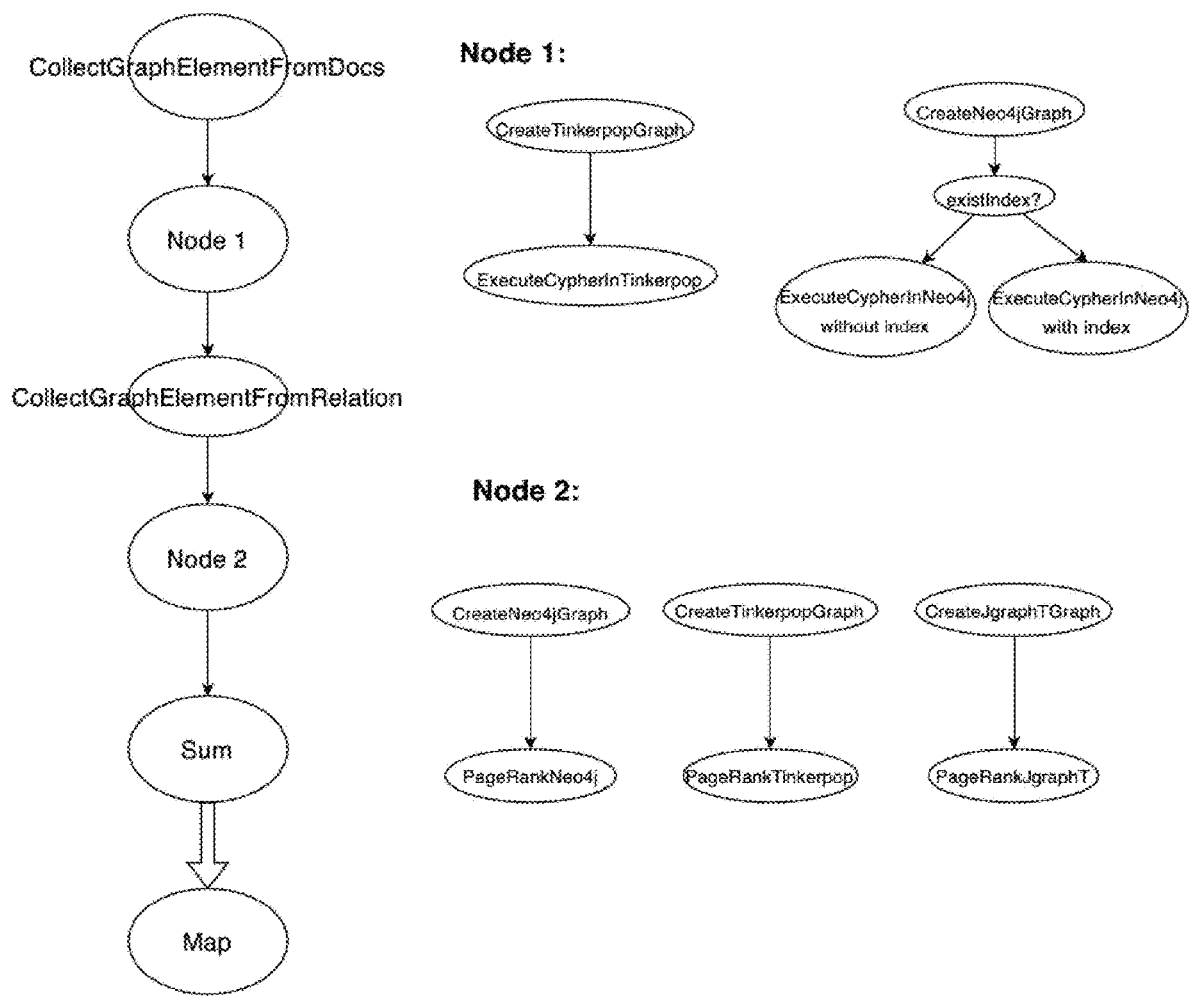
FIG. 7 depicts a schematic diagram illustrating an example of generating candidate physical plans, in accordance with some example embodiments.

The query processing engine 120 may apply Algorithm 2 below, which takes an optimized logical plan as input and generates candidate physical plans as follows. The patterns are ordered based on their size to make sure that the larger patterns are matched earlier. For some logical operators, they have only one candidate physical sub-plan. For example, SumList will be translated to SumList, and LDA will be translated to LDA. For these operators, their nodes in the logical directed acyclic graph will be directly replaced by the physical operator nodes (lines 7-8). For some logical operators or logical sub-DAGs, they have multiple candidate physical sub-plans. For example, as illustrated in FIG. 7, a logical sub-DAG CreateGraph→ExecuteCypher can be transformed to two different physical sub-plans. For these operators or sub-DAGs, they will be replaced by virtual nodes, and each node and its corresponding physical sub-plans will be stored in the map PM (lines 9-10).

| Algorithm 2: Candidate Physical Plans Generation |
| --- |
| Input: A pattern set Pat; An optimal logical plan DAG G = (V, E).
Output: Candidate physical plans; PG and PM.
/* Order patterns by the size (number of nodes of logical sub-DAGs. */
1 sortedPat = Pat.keys.sort(key = i : size(i.nodes), reverse = true);
2 PG ← G, PM ← { };
 /* match patterns from largest to smallest. */
3 for pat ∈ sortedPat do
4  pSubs ← Pat[pat];
5  lSubs ← FindMatchPattern (PG, pat);
6  for sub ∈ lSubs do
   /* for a pattern which only has one physical sub-plan
    directly replace the patter with the DAG. */
7   if pSubs.size == 1 then
8    PG ← SingleOperatorTransform (PG, sub, pSubs;
   /* for a pattern with several candidate physical
    sub-plans, transform sub to a virtual node and add
    the node id and physical sub-plans to map PM. */
9   else
10    PG, PM ← PatternTransform (PG, PM, sub, PSubs); |

The query planning stage may generate multiple candidate physical plans, and in execution stage, the query processing engine 120 may select an optimal one at run-time based on a learned cost model. For example, for each pattern that has different execution paths, synthetic datasets may be created and the executor/sub-plan may be run with different input parameters to collect execution times. Then a linear regression model with the polynomial of parameters as features may be applied to create a predictive model for execution cost.

Benchmark results may be generated for various operators including by evaluating relation-related patterns and graph-related patterns. For graph operators, common operators such as CreateGraph and PageRank are evaluated while for ExecuteCypher, there are various types of Cypher queries and two typical types of queries are evaluated. For node or edge property predicates, there is a series of predicates on node or edge properties. For example, Match (n)-fl-(m) where n.value in L and m. value in L where L is a list of strings. The size of L will be a feature that decides the query cost. In full text search queries, there is a node/edge property which contains long text and the queries will find out the node/edge where that text property contains specific strings. For example, Match (n)-[ ]-(m) where n.value contains string1 or n.value contains string2 or . . . , where the number of the OR predicates is a feature of the cost model.

Figure 8:
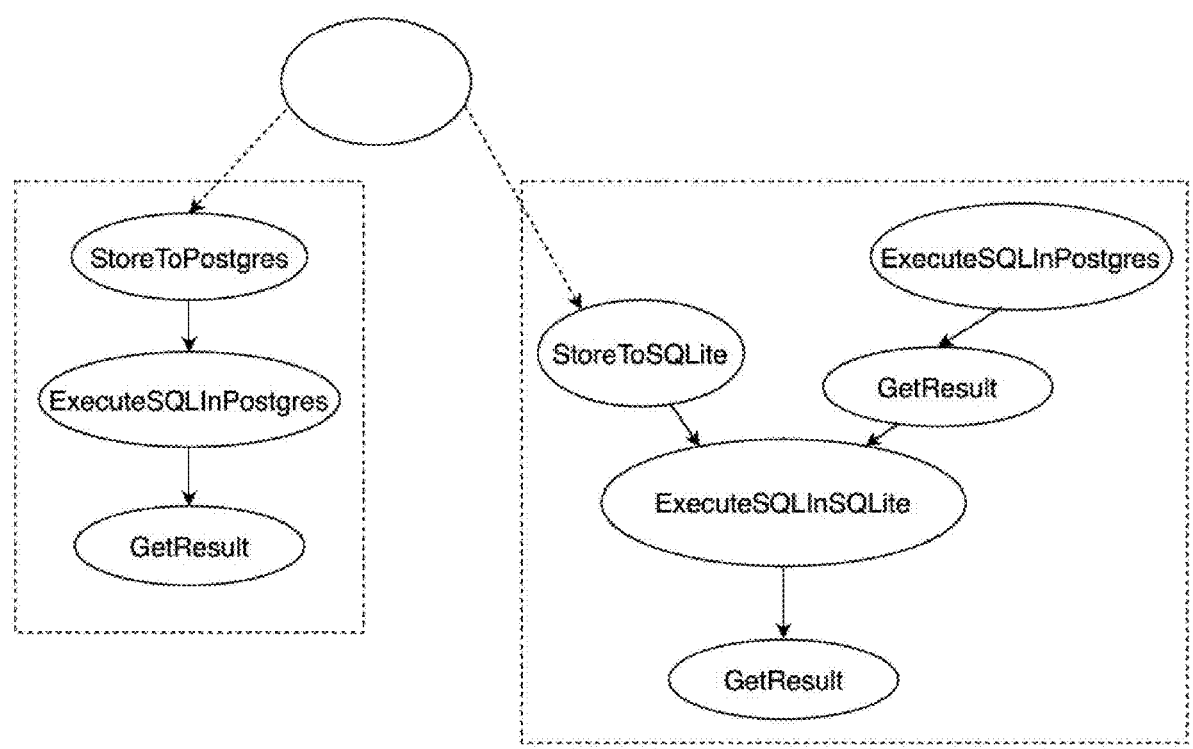
FIG. 8 depicts an example of execution sub-plans, in accordance with some example embodiments.

For relation operators, the ExecuteSQL operator may be tested. Based on the locations of the tables in the operator, there are different candidate execution sub-plans corresponding to this operator. For example, if all tables involved are tables in the polystore 110 generated from the upstream operators, then there are two candidate plans: (a) store all relations in in-memory SQLite, and execute the query in SQLite; (b) store all relations in Postgres, and execute the query in Postgres. If there are both tables from the polystore 110 and Postgres involved in the query, the candidate plans are different as illustrated in FIG. 8. As the left dashed rectangle shows, the tables from the polystore 110 may be stored to Postgres, then execute in Postgres; as the right dashed rectangle shows, the tables in polystore 110 may be stored to SQLite and select the columns needed from Postgres tables and store them to SQLite, then the query will be executed in SQLite.

Two synthetic datasets may be used for benchmarking: graph datasets and relation datasets which are used for graph- and relation-related patterns respectively. Table 4 below depicts the statistics associated with each dataset.

TABLE 4

| | | | Graph Datasets | | | |
|---|---|---|---|---|---|---|
| edge size | avg. density | node/edge property | keyword size | node size | node/edge property | keyword size |
| 500, 1k, 3k, 5k, 8k, 15k, 25k, 35k, 40k, 50k, 60k, 70k, 80k, 90k, 100k, 500k, 800k, | 2 | value:String | 50, 100, 500, 1k, 2k, 5k, 8k, 10k, 13k, 15k, 20k, 25k, 30k, 35k, 40k, 45k | 5k, 10k, 50k, 100k, 500k | tweet:String | 50, 100, 500, 1000 |

| Relation Datasets | |
|---|---|
| Postgres table row count | Awesome table row count |
| 100, 1000, 10000, 100000 | 100, 1000, 10000, 100000 |

For graph datasets, there are two types of graphs: The first type of datasets are used to test operators like CreateGraph and the first type of ExecuteCypher queries. Several property graphs are created with different edge sizes, and to simplify the model, the density of graphs is kept as 2, which means on average each node has two edges; each node (or edge) has a value which is a unigram and we make sure each node's (or edge's) value property is unique, and keywords are created from the values set to test the Cypher queries. Under this setting, there is exactly one node/edge with a keyword as value, thus the keyword size and edge size can indirectly reflect the selectivity of the queries. The second dataset is designed for the second type of ExecuteCypher queries. Graph is created with different node sizes and each node has a tweet property where the tweet values are actual tweets collected from Twitter. All the unigrams from the tweets are collected and after removing the top and the least frequent words from them, words are randomly selected to create different sizes of keywords lists.

Figure 9:
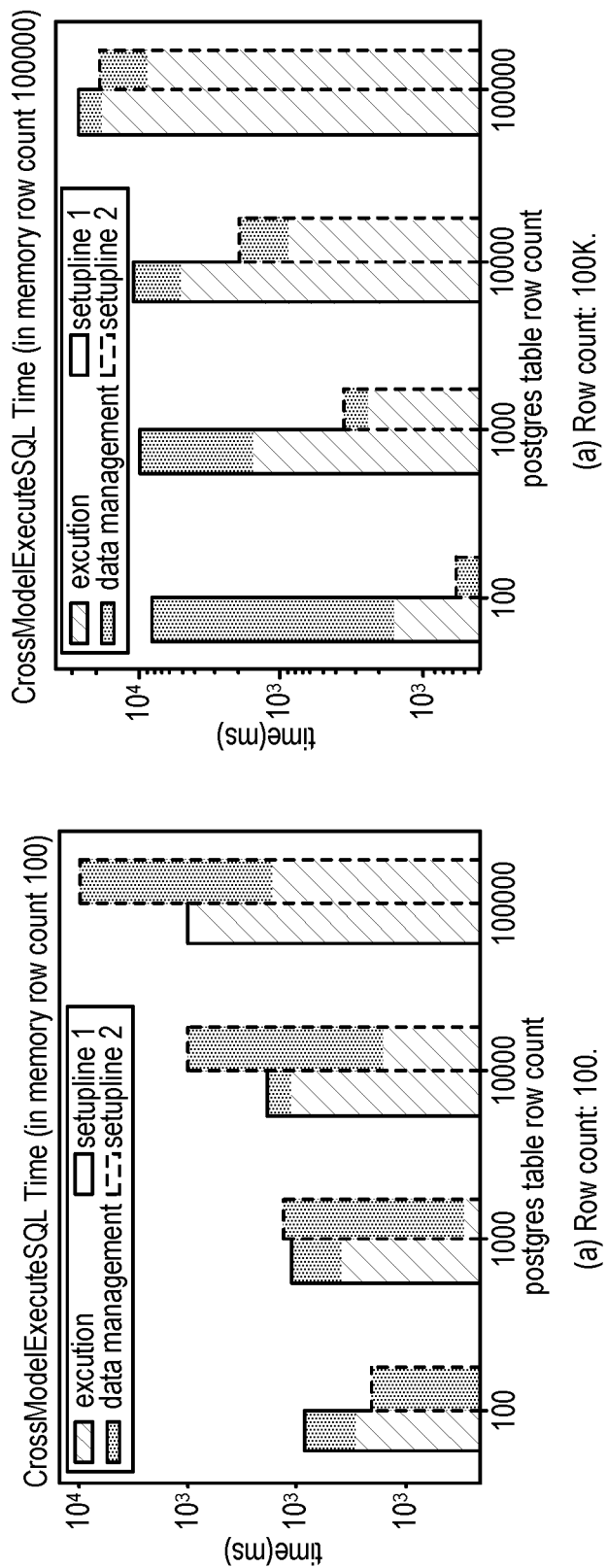
FIG. 9 depicts examples of benchmark results for a cross-model table join, in accordance with some example embodiments.

FIG. 9 shows some graph operators in which graph size (the number of edges) is used as a feature in their cost models. The benchmark experiment collects the execution time for three different executors. For the two types of ExecuteCypher queries, node (edge) size is used as feature if the predicates in the query are on the node (edge) property.

The cost model may be used at run-time when the input is returned from the upstream operator and then the features are collected and passed to the cost model. All the cost of different candidate plans will be calculated and the plan with the lowest estimated cost will be chosen. At execution stage, the query processing engine 120 may implicitly add some type casting operations when needed. For example, in FIG. 5, prior to map fusion, suppose that the executors decided by the cost model for CreateGraph and ExecuteCypher are CreateJgraphTGraph and ExecuteCypherinTinkerpop, then a JgraphTToTinkerpop type cast executor will be added at run time.

An executor p, is associated with an attribute p.para E {S,P} where S stands for serialization capability and P stands for parallelism capability, and if p.para=P, p has another attribute capOn which specifies the input parameter that this executor has parallelism capability on. All operators which have parallel capability will be executed in parallel by partitioning the capOn input data. When a parallel operator gets its input: if its capOn input was not partitioned, it will partition the data (operator 5), and generate partitioned result for the downstream operator; if other inputs were partitioned, then they will be merged (operator 3 takes two partitioned input from other two operators and will merge the input from operator 2); When a serialized operator gets partitioned input (operator 4), it will merge the input.

As noted, in some example embodiments, the query processing engine 120 may process a query corresponding to the analysis plan 135 by generating a logical plan and one or more corresponding physical plans. The query processing engine 120 may apply various optimizations strategies when rewriting the logical plan and selecting a physical plan based on a learned cost model. As noted, the analysis plan 135 may contain cross-model view construction rules from a first data model to a second data model, which requires the query processing engine 120 to infer constraints between the data objects corresponding to the first data model and the data objects corresponding to the second data model. Thus, one example optimization technique may therefore include applying, based on the inferred constraints, a set of capability-based optimization rules, which may give rise to a more parallelized execution plan. For example, since Solr has a restriction on the number of terms it can process in one query, the query processing engine 120 may divide long lists into smaller lists and execute the Solr search operation on these lists in a parallel manner.

In some cases, the logical plan may be optimized by decomposing a single function into a set of sub-functions and executing one or more of the sub-functions separately, outside of the function, to achieve optimization. For example, topic modeling may require the computation of a term-document matrix and a term co-occurrence matrix. For a large dataset, these matrices may be precomputed faster outside the topic model before being fed to the topic model as an intermediate step. That is, the term document matrix and the term co-occurrence matrix may be pre-computed outside of the topic modeling function and the topic modeling function may be executed from the sub-functions subsequent to the matrix computations. Such an optimization may not be necessary for smaller datasets.

The query processing engine 120 may also employ one or more techniques for parameter selection of an expensive function that can accept multiple forms of input and has multiple optional parameters. Parameter selection may apply a set of rules that take into account partial results produced in the previous steps of the analysis plan. For example, in topic modeling, an initial distribution of the topic probabilities of terms may be an optional parameter. For data with a large number of documents and a large number of terms, the data may be first sampled to create a rough estimate of the topic probabilities, thus providing the topic modeling operation with the optional parameter to expedite subsequent execution.

The query processing engine 120 may employ optimized "plan templates," which are small plan subgraphs for specific query patterns involving compositions of retrieval operations, manipulation operations, and function-calls. In some example embodiments, the query processing engine 120 may estimate the cost of these templates by benchmark-based machine learning techniques. For example, a query plan pattern like (Documents→ExtractPOS→ExtractNER→ExtractDependencyParseTrees) can be replaced with the plan subgraphs (Documents→ExtractSentencesa BatchSentences→ParallelExecute(ExtractPOS→ExtractNER→ExtractDependencyParseTrees)), which have a lower estimated cost.

The query processing engine 120 may also employ function substitution, function injection strategies based on the properties of functions, data types, data volume, and other factors. In one variant, function substitution can result in an approximated query results to satisfy user-provided time or resource constraints. For example, if the dataset incudes documents with a highly correlated vocabulary, the query processing engine 120 may substitute singular-value decomposition (SVD) for latent dirichlet allocation (LDA) to provide an approximate result in less time and/or using less computational resources.

The query processing engine 120 may employ cross-model indexes, which is an index structure that co-indexes pairs of data items with a first item belonging to a first database management system with a first data model and a second item belonging to a second database management system with a second data model. For example, for every significant noun phrase in the text data, the query processing engine 120 may create a poly-index in which each entry includes a document containing the phrase, the relational records that contain the phrase, and the nodes whose properties contain the phrase.

In some cases, the query processing engine 120 may employ auxiliary model-specific query rewriting rules that a native database management system of the model may not employ. For example, for graph data, if a query requires the top k highest PageRank nodes, a degree distribution may be cheaply computed and nodes with very low connectivity are discarded before computing the PageRank.

In some cases, the query processing engine 120 may employ cross-model query rewriting rules to reduce the cost of "join"-like operations between database management systems belonging to different data models. For example, if a there a join between a relational table and a graph based on node properties, and the graph side of the query only returns node properties and the query conditions do not involve a network level computation, the query processing engine 120 may rewrite the logical plan to avoid querying the graph based on mappings between the two systems, and perform the whole query on the relational side.

Figure 10:
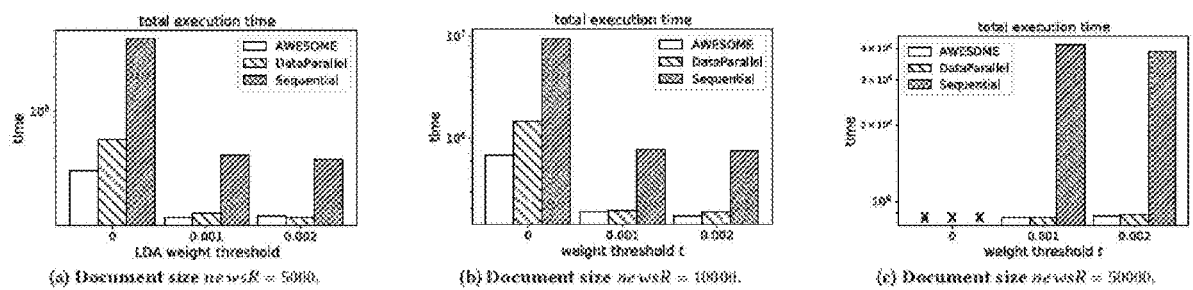
FIG. 10 depicts the graphs illustrating the relationship between execution time and document size for different execution methods, in accordance with some example embodiments.

The optimizations applied by the query processing engine 120 may improve efficiency of analytical workloads. For example, FIG. 10 depicts the end-to-end time of some comparison methods for two different workloads. Table 5 below depicts the different methods, including AWESOME, which is the method associated with the polystore 110. The first workload is a complex text analytical task which focus on analytical functions and a series of high level operators, and the second workload focuses more on the polystore aspect of the system where input data is stored in heterogeneous data stores. FIG. 10 shows the results of Sequential, Sequential+CostModel, DataParallel, and the AWESOME method applied by the polystore 110. From the results, the AWESOME or DataParallel method presents great scalability when the parameters change. The parallel execution dramatically speeds up the execution time, especially when the input sizes for some operators is large. For example, for the first workload, when keywords weight threshold is set as 0 which means all words in a topic will be selected as keywords, the subsequent Map operators will take longer time and thus the sequential execution time is much larger than the AWESOME or DataParallel methods which execute Map operators in parallel. For the second workload, when the Solr document size is larger, the parallel execution of NER operator will show more advantage over sequential execution. The end-to-end execution time also illustrates the effectiveness of cost model, by comparing Sequentail+CostModel with Sequential, and comparing AWESOME with DataParallel, there is performance gain from cost model, especially when some input sizes get larger. For example, for the second workload, when graph size is larger, the cost model is more effective at reducing time.

TABLE 5

| | Methods | Description |
|---|---|---|
| Sequential Execution | Sequential | It does not use any Awesome feature including parallel execution and cost model. |
| | Sequential + CostModel | It applies cost model to generate the optimal plan and run each executor sequentially. |
| Parallel Execution | AWESOME | It has full AWESOME features including map fusion, cost model and data parallelism. |
| | DataParallel + CostModel | The difference between this and AWESOME is that it does not use map fusion. |
| | DataParallel | It does not apply map fusion and cost model to generate optimal plan, and runs each executor in parallel. |

Figure 11:
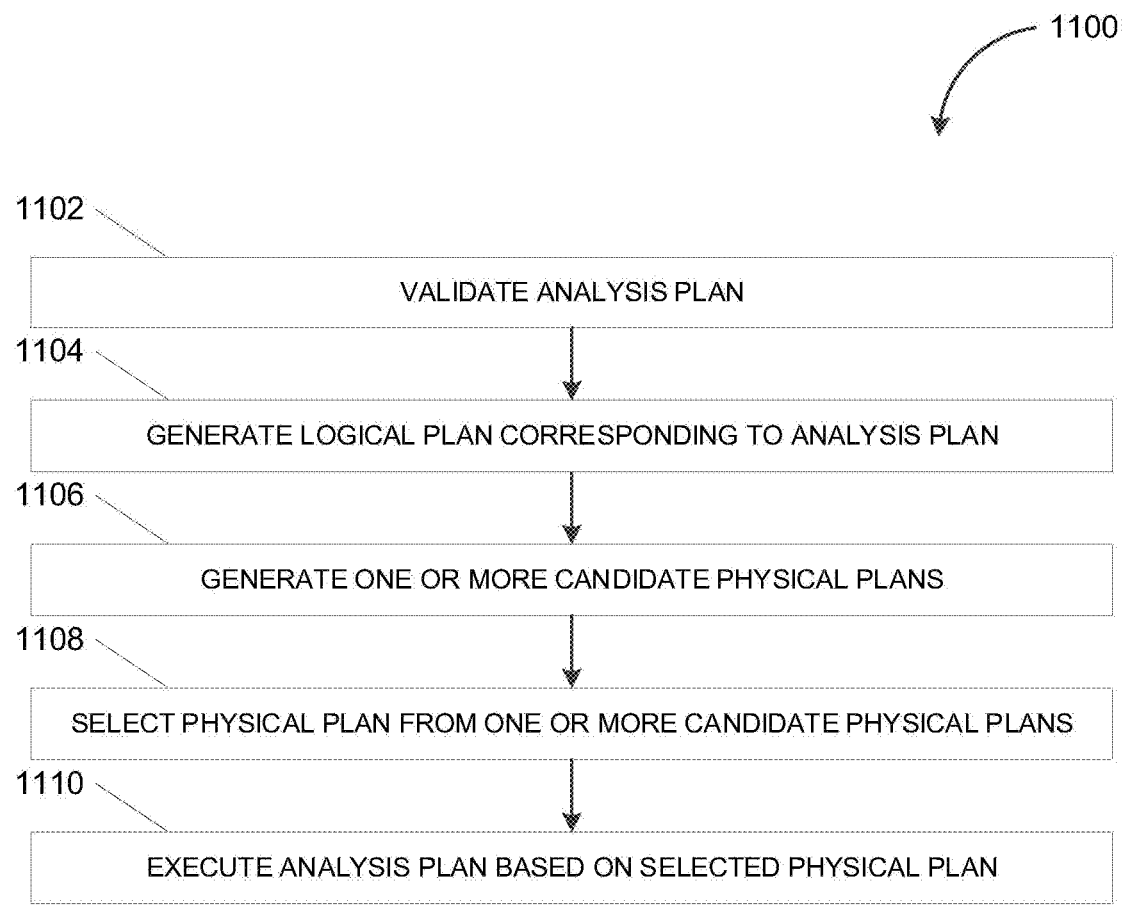
FIG. 11 depicts a flowchart illustrating an example of a process for query processing in a polystore, in accordance with some example embodiments.

FIG. 11 depicts a flowchart illustrating an example of a process 1100 for query processing in a polystore, in accordance with some example embodiments. In some example embodiments, the process 110 may be performed by the query processing engine 120 to process a query corresponding to the analysis plan 135 at the polystore 110.

At 1102, the query processing engine 120 may validate an analysis plan. For example, as shown in FIG. 3, the query processing engine 120 may validate, based at least on the system catalog, the function catalog, and the variable metadata associated with the one or more polystores 110, the analysis plan 135. The validation may include a syntax check, a semantic validation, and type inference. As noted, if the analysis plan 135 contains cross-model view construction rules from a first data model to a second data model, the query processing engine 120 may infer constraints between data objects corresponding to the first data model and the data objects corresponding to the second data model.

At 1104, the query processing engine 120 may generate a logical plan corresponding to the analysis plan. In some example embodiments, upon validating the analysis plan 135, the query processing engine 120 may generate, based on one or more function translation rules, a logical plan for the analysis plan 135. Furthermore, the query processing engine 120 may apply one or more logical rewriting rules to optimize the logical plan including, for example, redundancy elimination, pipeline execution, and/or the like. It should be appreciated that a variety of optimization strategies may be applied to rewrite the optimization. For example, the logical plan for the analysis plan 135 may be optimized by merging common logical operators and pipelining operations to minimize the materialization of intermediate results.

At 1106, the query processing engine 120 may generate one or more candidate physical plans. In some example embodiments, the query processing engine 120 may generate one or more candidate physical plans for the logical plan generate for the analysis plan 135. For example, given a logical plan, the query processing engine 120 may generate a set of candidate physical plans based on a pattern set. Furthermore, the query processing engine 120 may apply additional optimizations. For instance, since the Map operator has a pipeline capability, multiple Map operators can form a pipeline that the query processing engine 120 fuses into a single Map operator, thus connecting the sub-operators of each Map operator. This map fusion optimization may save time by avoiding the storage of intermediate results and help the creation of candidate physical plans.

At 1108, the query processing engine 120 may select a physical plan from the one or more candidate physical plans. At 1110, the query processing engine 120 may execute the analysis plan based on the selected physical plan. In some example embodiments, the query planning stage may generate multiple candidate physical plans, and in execution stage, the query processing engine 120 may select an optimal one at run-time based on a learned cost model. For example, for each pattern that has different execution paths, synthetic datasets may be created and the executor/sub-plan may be run with different input parameters to collect execution times. A linear regression model with the polynomial of parameters as features may then be applied to create a predictive model for execution cost. In some cases, the query processing engine 120 may employ optimized "plan templates," which are small plan subgraphs for specific query patterns involving compositions of retrieval operations, manipulation operations, and function-calls. Here, the query processing engine 120 may estimate the cost of these templates by benchmark-based machine learning techniques such that the selection of a physical plan is performed based on these estimated costs.

Figure 12:
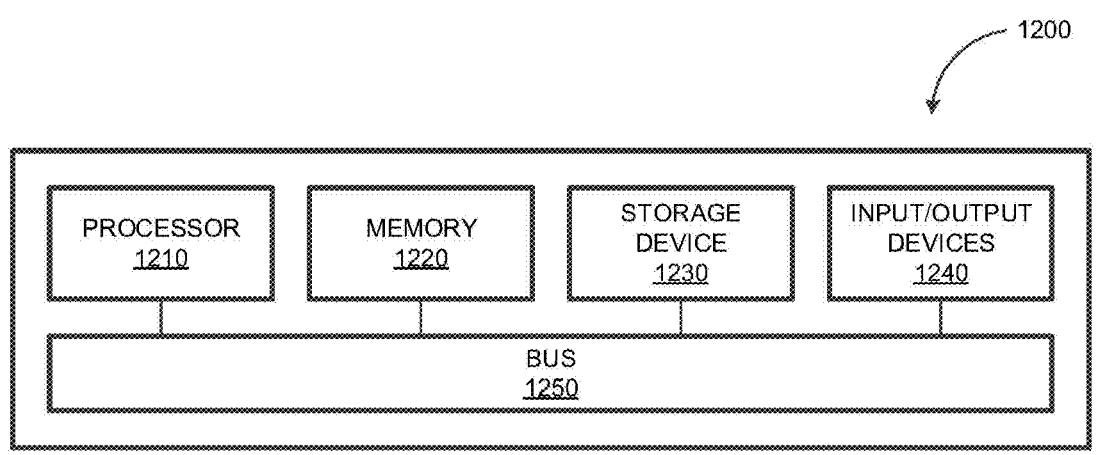
FIG. 12 depicts a block diagram illustrating an example of a computing system, in accordance with some example embodiments.

FIG. 12 depicts a block diagram illustrating a computing system 1200 consistent with implementations of the current subject matter. Referring to FIGS. 1 and 12, the computing system 1200 can be used to implement the query processing engine 120 and/or any components therein.

As shown in FIG. 12, the computing system 1200 can include a processor 1210, a memory 1220, a storage device 1230, and input/output device 1240. The processor 1210, the memory 1220, the storage device 1230, and the input/output device 1240 can be interconnected via a system bus 1250. The processor 1210 is capable of processing instructions for execution within the computing system 1200. Such executed instructions can implement one or more components of, for example, the query processing engine 120. In some example embodiments, the processor 1210 can be a single-threaded processor. Alternately, the processor 1210 can be a multi-threaded processor. The processor 1210 is capable of processing instructions stored in the memory 1220 and/or on the storage device 1230 to display graphical information for a user interface provided via the input/output device 1240.

The memory 1220 is a computer readable medium such as volatile or non-volatile that stores information within the computing system 1200. The memory 1220 can store data structures representing configuration object database management systems, for example. The storage device 1230 is capable of providing persistent storage for the computing system 1200. The storage device 1230 can be a floppy disk device, a hard disk device, an optical disk device, a solid-state device, a tape device, and/or any other suitable persistent storage means. The input/output device 1240 provides input/output operations for the computing system 1200. In some example embodiments, the input/output device 1240 includes a keyboard and/or pointing device. In various implementations, the input/output device 1240 includes a display unit for displaying graphical user interfaces.

According to some example embodiments, the input/output device 1240 can provide input/output operations for a network device. For example, the input/output device 1240 can include Ethernet ports or other networking ports to communicate with one or more wired and/or wireless networks (e.g., a local area network (LAN), a wide area network (WAN), the Internet).

In some example embodiments, the computing system 1200 can be used to execute various interactive computer software applications that can be used for organization, analysis and/or storage of data in various formats. Alternatively, the computing system 1200 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1240. The user interface can be generated and presented to a user by the computing system 1200 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   generating, based at least on an analysis plan, a logical plan, the analysis plan specifying one or more operations performed on at least a portion of data stored in a polystore that includes a first database management system and a second database management system, the logical plan including a sequence of logical operators corresponding to the one or more operators specified by the analysis plan, the generating of the logical plan includes rewriting the sequence of logical operators by at least reordering, replacing, and/or combining one or more logical operators in the sequence of logical operators;
   generating, based at least on the logical plan, a plurality of candidate physical plans;
   generating a cross-model index for a first data stored in the first database management system having a first data model and a second data stored in the second database management system having a second data model; and
   executing, based at least on the cross-model index and a physical plan selected from the plurality of candidate physical plans, the analysis plan.

2. The system of claim 1, wherein the sequence of logical operators is rewritten based at least on a first capability of the first database management system and/or a second capability of the second database management system.

3. The system of claim 1, wherein the sequence of logical operators is rewritten by at least decomposing a logical operator from the sequence of logical operators into at least a first sub-operation and a second sub-operation, executing the first sub-operation outside of the logical operator, and resuming execution of the logical operator from the second sub-operation.

4. The system of claim 1, wherein the sequence of logical operators is rewritten by at least providing, to a logical operator, data corresponding to an optional parameter of the logical operator.

5. The system of claim 1, wherein the sequence of logical operators is rewritten by at least replacing, based on a time constraint and/or a computational resource constraint, a first logical operator with a second logical operator providing an approximation of a result of the first logical operator.

6. The system of claim 1, wherein the sequence of logical operators is rewritten by at least inserting a first logical operator whose output is used by a second logical operator.

7. The system of claim 1, wherein the sequence of logical operators is rewritten by at least executing a logical operator in the first database management system but not in the second database management system.

8. The system of claim 1, wherein the operations further comprise:
   selecting, based at least on a cost model, the physical plan for executing the analysis plan.

9. The system of claim 8, wherein the cost model is generated by estimating a cost of one or more subgraphs forming each of the plurality of candidate physical plans.

10. The system of claim 9, the operations may further comprise:
   identifying, based at least on the cost model, a first subgraph having a lower estimated cost than a second subgraph of the physical plan;
   replacing the second subgraph of the physical plan with the first subgraph having the lower estimated cost; and
   executing the analysis plan based at least on the physical plan with the first subgraph instead of the second subgraph.

11. The system of claim 1, wherein the analysis plan includes one or more statements assigning a variable to an expression, and wherein at least one statement combines a first data object conforming to a first data model of the first database management system and a second sub-object conforming to a second data model of the second database management system.

12. The system of claim 11, wherein the operations further comprise:
   inferring, from the analysis plan, a first constraint associated with the first data model and a second constraint associated with the second data model; and
   validating, based at least on the first constraint and the second constraint, the analysis plan.

13. The system of claim 12, wherein the analysis plan is further validated by performing one or more of a syntax check and a semantic validation.

14. The system of claim 1, wherein a result of executing the analysis plan includes a composite data object comprising a first sub-object conforming to a first data model of the first database management system and a second sub-object conforming to a second data model of the second database management system.

15. A computer-implemented method, comprising:
   generating, based at least on an analysis plan, a logical plan, the analysis plan specifying one or more operations performed on at least a portion of data stored in a polystore that includes a first database management system and a second database management system, the logical plan including a sequence of logical operators corresponding to the one or more operators specified by the analysis plan, the generating of the logical plan includes rewriting the sequence of logical operators by at least reordering, replacing, and/or combining one or more logical operators in the sequence of logical operators;
   generating, based at least on the logical plan, a plurality of candidate physical plans;
   generating a cross-model index for a first data stored in the first database management system having a first data model and a second data stored in the second database management system having a second data model; and
   executing, based at least on the cross-model index and a physical plan selected from the plurality of candidate physical plans, the analysis plan.

16. The method of claim 15, wherein the sequence of logical operators is rewritten based at least on a first capability of the first database management system and/or a second capability of the second database management system.

17. The method of claim 15, wherein the rewriting of the sequence of logical operators includes one or more of
   decomposing a logical operator from the sequence of logical operators into at least a first sub-operation and a second sub-operation, executing the first sub-operation outside of the logical operator and resuming execution of the logical operator from the second sub-operation,
   providing, to the logical operator, data corresponding to an optional parameter of the logical operator,
   replacing, based on a time constraint and/or a computational resource constraint, a first logical operator with a second logical operator providing an approximation of a result of the first logical operator,
   inserting a first logical operator whose output is used by a second logical operator, and
   executing a logical operator in the first database management system but not in the second database management system.

18. The method of claim 15, further comprising:
   selecting, based at least on a cost model, the physical plan for executing the analysis plan, the cost model being generated by estimating a cost of one or more subgraphs forming each of the plurality of candidate physical plans;
   identifying, based at least on the cost model, a first subgraph having a lower estimated cost than a second subgraph of the physical plan;
   replacing the second subgraph of the physical plan with the first subgraph having the lower estimated cost; and
   executing the analysis plan based at least on the physical plan with the first subgraph instead of the second subgraph.

19. A non-transitory computer readable medium storing instructions, which when executed by at least one data processor, result in operations comprising:
   generating, based at least on an analysis plan, a logical plan, the analysis plan specifying one or more operations performed on at least a portion of data stored in a polystore that includes a first database management system and a second database management system, the logical plan including a sequence of logical operators corresponding to the one or more operators specified by the analysis plan, the generating of the logical plan includes rewriting the sequence of logical operators by at least reordering, replacing, and/or combining one or more logical operators in the sequence of logical operators;
   generating, based at least on the logical plan, a plurality of candidate physical plans;
   generating a cross-model index for a first data stored in the first database management system having a first data model and a second data stored in the second database management system having a second data model; and
   executing, based at least on the cross-model index and a physical plan selected from the plurality of candidate physical plans, the analysis plan.

* * * * *